US008624426B2

(12) United States Patent
Kato

(10) Patent No.: US 8,624,426 B2
(45) Date of Patent: Jan. 7, 2014

(54) POWER SUPPLY SYSTEM FOR ELECTRICALLY POWERED VEHICLE, ELECTRICALLY POWERED VEHICLE, AND METHOD FOR CONTROLLING POWER SUPPLY SYSTEM OF ELECTRICALLY POWERED VEHICLE

(75) Inventor: Norihiko Kato, Handa (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 294 days.

(21) Appl. No.: 13/259,396

(22) PCT Filed: Jun. 10, 2009

(86) PCT No.: PCT/JP2009/060590
§ 371 (c)(1),
(2), (4) Date: Sep. 23, 2011

(87) PCT Pub. No.: WO2010/143279
PCT Pub. Date: Dec. 16, 2010

(65) Prior Publication Data
US 2012/0013184 A1  Jan. 19, 2012

(51) Int. Cl.
B60L 1/00 (2006.01)
B60L 3/00 (2006.01)
H02G 3/00 (2006.01)

(52) U.S. Cl.
USPC ............... 307/9.1; 307/85; 307/87; 307/115; 903/903; 361/191

(58) Field of Classification Search
USPC .................. 307/9.1, 115, 85–87; 903/903
See application file for complete search history.

(56) References Cited

U.S. PATENT DOCUMENTS

| 6,137,250 | A  | * | 10/2000 | Hirano et al. | ................. | 318/376 |
| 7,933,694 | B2 | * | 4/2011  | Kato          | ................. | 701/22  |
| 8,072,725 | B2 | * | 12/2011 | Kosaki et al. | ................. | 361/93.1|
| 8,423,210 | B2 | * | 4/2013  | Kato          | ................. | 701/22  |

FOREIGN PATENT DOCUMENTS

| JP | 2004-312863 A  |   | 11/2004 |
| JP | 2004-359032 A  |   | 12/2004 |
| JP | 2008-109840 A  |   | 5/2008  |
| JP | 2008-167620 A  |   | 7/2008  |
| JP | 2008167620  A  | * | 7/2008  |
| JP | 2008-220084 A  |   | 9/2008  |

OTHER PUBLICATIONS

International Search Report mailed Sep. 15, 2009 of PCT/JP2009/060590.

* cited by examiner

Primary Examiner — Rexford Barnie
Assistant Examiner — Daniel Kessie
(74) Attorney, Agent, or Firm — Kenyon & Kenyon LLP

(57) ABSTRACT

A power supply system includes a main power storage device and a plurality of sub power storage devices. A converter is sequentially connected to one of the sub power storage devices to convert voltage between the selected sub power storage device and an electric power feeding line bidirectionally. The sub power storage device undergoes a connection switching process, and when there is no new sub power storage device remaining for replacement, then, in accordance with that sub power storage device's SOC and the vehicle's state, a request is generated to disconnect the sub power storage device. Here, when a condition regarding a temperature of at least one of the main power storage device and the plurality of sub power storage devices is satisfied, generation of a disconnection request is prohibited, in order to protect the main power storage device.

15 Claims, 13 Drawing Sheets

POWER SUPPLY SYSTEM FOR ELECTRICALLY POWERED VEHICLE, ELECTRICALLY POWERED VEHICLE, AND METHOD FOR CONTROLLING POWER SUPPLY SYSTEM OF ELECTRICALLY POWERED VEHICLE

CROSS REFERENCE TO RELATED APPLICATION

This is a 371 national phase application of PCT/JP2009/060590 filed Jun. 10, 2009, the content of which is incorporated herein by reference in its entirety.

TECHNICAL FIELD

The present invention relates to a power supply system for an electrically powered vehicle, an electrically powered vehicle, and a method for controlling a power supply system of an electrically powered vehicle, and more particularly to control for a power supply system of an electrically powered vehicle having a main power storage device and a plurality of sub power storage devices mounted thereon.

BACKGROUND ART

In recent years, as an environmentally friendly vehicle, electrically powered vehicles such as electric cars, hybrid cars and fuel cell cars have been developed into practical use. These electrically powered vehicles have mounted thereon an electric motor generating force to drive the vehicle and a power supply system for supplying electric power to drive the motor, that is configured to include a power storage device.

In particular for hybrid cars, there has been proposed a configuration charging a vehicle-mounted power storage device by a power supply external to the vehicle (hereinafter also referred to as an "external power supply"), and accordingly, these electrically powered vehicles require increased distances travelable on electric power stored in the vehicle-mounted power storage device. Hereinafter, charging a vehicle-mounted power storage device by an external power supply will also simply be referred to as "external charging".

For example, Japanese Patent Laying-Open No. 2008-109840 (Patent Document 1) describes a power supply system having a plurality of power storage devices (batteries) connected in parallel. The power supply system described in Patent Document 1 is provided with a voltage converter (a converter) for each power storage device (battery) as a charging/discharging adjustment mechanism. In contrast, Japanese Patent Laying-Open No. 2008-167620 (Patent Document 2) describes a configuration of a power supply device in a vehicle having a main power storage device and a plurality of sub power storage devices mounted thereon, that provides a converter associated with the main power storage device and a converter shared by the plurality of sub power storage devices. This configuration can achieve a reduced number of elements in the device and also an increased storable amount of energy.

In particular, the configuration described in Patent Document 2 has one of the plurality of sub power storage devices selectively connected to the converter to allow the main power storage device and the selected sub power storage device to supply electric power to drive an electric motor for driving a vehicle. In the power supply device, when the sub power storage device in use has a decreased state of charge (SOC), a different sub power storage device is connected to the converter to use the plurality of sub power storage devices sequentially to allow stored electric energy to be used to achieve increased travelable distance (EV (Electric Vehicle) travelable distance).

CITATION LIST

Patent Literature

PTL 1: Japanese Patent Laying-Open No. 2008-109840
PTL 2: Japanese Patent Laying-Open No. 2008-167620

SUMMARY OF INVENTION

Technical Problem

In the power supply system described in Patent Document 2, when all of the sub power storage devices have completely used their stored electricity, positively, electrically disconnecting all of the sub power storage devices from the converter can be expected to allow the power supply system to be subsequently controlled with an increased degree of freedom.

On the other hand, as electric power is input/output only to/from the main power storage device, deterioration of the main power storage device may be more likely than in an example where both of the main power storage device and the sub power storage devices can be used. In an example where only the main power storage device is used under a high temperature (or a low temperature), a situation is severe to the main power storage device and deterioration of the main power storage device is further likely.

The present invention has been made to overcome such disadvantage and an object of the present invention is to provide a technique for achieving appropriate protection of a main power storage device in a power supply system configured to include a main power storage device and a plurality of sub power storage devices sharing a voltage converter (a converter).

Solution to Problem

A power supply system for an electrically powered vehicle according to one aspect of the present invention is a power supply system of an electrically powered vehicle incorporating a motor for generating power to drive the vehicle and an inverter for driving the motor. The power supply system includes a main power storage device, an electric power feeding line for feeding electric power to the inverter, a first voltage converter, a plurality of sub power storage devices provided in parallel to each other, a first voltage converter, a second voltage converter, a connection unit, and a control device. The first voltage converter is provided between the electric power feeding line and the main power storage device and configured to convert voltage therebetween bidirectionally. The second voltage converter is provided between the plurality of sub power storage devices and the electric power feeding line, and configured to convert voltage between a sub power storage device selected from the plurality of sub power storage devices and the electric power feeding line bidirectionally. The connection unit is provided between the plurality of sub power storage devices and the second voltage converter, and configured to connect and disconnect the selected sub power storage device to and from the second voltage converter. The control device is configured to control connection and disconnection of the selected sub power storage device to and from the second voltage converter. The control device includes a disconnection determination unit and a disconnection prohibition unit. The disconnection determination unit is configured to determine whether a disconnection request for disconnecting the selected sub power storage device from the second voltage converter should be generated or not based on a state of charge of the selected sub power storage device, when there is no new sub power storage device allowed to replace the selected sub power storage device. The disconnection prohibition unit is configured to instruct the disconnection determination unit not to generate the disconnection request when a temperature condition regarding a temperature of at least one power storage device of the main power storage device and the plurality of sub power storage devices is satisfied.

Preferably, the control device further includes an electric power limiter unit. The electric power limiter unit is configured to limit input electric power and output electric power to/from the main power storage device when a temperature of the main power storage device is out of a predetermined range. At least one power storage device includes the main power storage device. The temperature condition includes a first condition that the temperature of the main power storage device is out of the predetermined range.

Preferably, the temperature condition is at least one condition of the first condition and a second condition regarding temperatures of the plurality of sub power storage devices. The second condition is a condition that the temperature of at least one sub power storage device of the plurality of sub power storage devices is lower than a predetermined lower limit value.

Preferably, at least one sub power storage device is a remaining sub power storage device except for the selected sub power storage device out of the plurality of sub power storage devices.

Preferably, the disconnection prohibition unit is configured to set at least one condition as the temperature condition when the electrically powered vehicle is started, and to set only the first condition as the temperature condition after start of the electrically powered vehicle is completed.

An electrically powered vehicle according to another aspect of the present invention includes a motor for generating power to drive the vehicle, a main power storage device, an electric power feeding line for feeding electric power to an inverter, a first voltage converter, a plurality of sub power storage devices provided in parallel to each other, a first voltage converter, a second voltage converter, a connection unit, and a control device. The first voltage converter is provided between the electric power feeding line and the main power storage device and configured to convert voltage therebetween bidirectionally. The second voltage converter is provided between the plurality of sub power storage devices and the electric power feeding line, and configured to convert voltage between a sub power storage device selected from the plurality of sub power storage devices and the electric power feeding line bidirectionally. The connection unit is provided between the plurality of sub power storage devices and the second voltage converter, and configured to connect and disconnect the selected sub power storage device to and from the second voltage converter. The control device is configured to control connection and disconnection of the selected sub power storage device to and from the second voltage converter. The control device includes a disconnection determination unit and a disconnection prohibition unit. The disconnection determination unit is configured to determine whether a disconnection request for disconnecting the selected sub power storage device from the second voltage converter should be generated or not based on a state of charge of the selected sub power storage device, when there is no new sub power storage device allowed to replace the selected sub power storage device. The disconnection prohibition unit is configured to instruct the disconnection determination unit not to generate the disconnection request when a temperature condition regarding a temperature of at least one power storage device of the main power storage device and the plurality of sub power storage devices is satisfied.

Preferably, the control device further includes an electric power limiter unit. The electric power limiter unit is configured to limit input electric power and output electric power to/from the main power storage device when a temperature of the main power storage device is out of a predetermined range. At least one power storage device includes the main power storage device. The temperature condition includes a first condition that the temperature of the main power storage device is out of the predetermined range.

Preferably, the temperature condition is at least one condition of the first condition and a second condition regarding temperatures of the plurality of sub power storage devices. The second condition is a condition that the temperature of at least one sub power storage device of the plurality of sub power storage devices is lower than a predetermined lower limit value.

Preferably, at least one sub power storage device is a remaining sub power storage device except for the selected sub power storage device out of the plurality of sub power storage devices.

Preferably, the disconnection prohibition unit is configured to set at least one condition as the temperature condition when the electrically powered vehicle is started, and to set only the first condition as the temperature condition after start of the electrically powered vehicle is completed.

A method for controlling a power supply system of an electrically powered vehicle according to yet another aspect of the present invention is a method of controlling a power supply system of an electrically powered vehicle incorporating a motor for generating power to drive the vehicle and an inverter for driving the motor. The power supply system includes a main power storage device, an electric power feeding line for feeding electric power to the inverter, a first voltage converter, a plurality of sub power storage devices provided in parallel to each other, a first voltage converter, a second voltage converter, a connection unit, and a control device. The first voltage converter is provided between the electric power feeding line and the main power storage device and configured to convert voltage therebetween bidirectionally. The second voltage converter is provided between the plurality of sub power storage devices and the electric power feeding line, and configured to convert voltage between a sub power storage device selected from the plurality of sub power storage devices and the electric power feeding line bidirectionally. The connection unit is provided between the plurality of sub power storage devices and the second voltage converter, and configured to connect and disconnect the selected sub power storage device to and from the second voltage converter. The control device is configured to control connection and disconnection of the selected sub power storage device to and from the second voltage converter. The control method includes the steps of determining whether a request for disconnecting the selected sub power storage device from the second voltage converter should be generated or not based on a state of charge of the selected sub power storage device, when there is no new sub power storage device allowed to replace the selected sub power storage device, and prohibiting generation of the request when a temperature condition based on a temperature of at least one power storage device of the power storage device and the plurality of sub power storage devices is satisfied.

Preferably, the control device further includes an electric power limiter unit. The electric power limiter unit is configured to limit input electric power and output electric power to/from the main power storage device when a temperature of the main power storage device is out of a predetermined range. At least one power storage device includes the main power storage device. The temperature condition includes a first condition that the temperature of the main power storage device is out of the predetermined range.

Preferably, the temperature condition is at least one condition of the first condition and a second condition regarding temperatures of the plurality of sub power storage devices. The second condition is a condition that the temperature of at least one sub power storage device of the plurality of sub power storage devices is lower than a predetermined lower limit value.

Preferably, at least one sub power storage device is a remaining sub power storage device except for the selected sub power storage device out of the plurality of sub power storage devices.

Preferably, the prohibiting step includes the step of setting the temperature condition. When the electrically powered vehicle is started, at least one condition is set as the temperature condition, whereas after start of the electrically powered vehicle is completed, only the first condition is set as the temperature condition.

Advantageous Effects of Invention

According to the present invention, in the power supply system configured to include a main power storage device and sub power storage devices, with a plurality of power storage devices sharing a voltage converter (a converter), the main power storage device can appropriately be protected.

DESCRIPTION OF EMBODIMENTS

Figure 1:
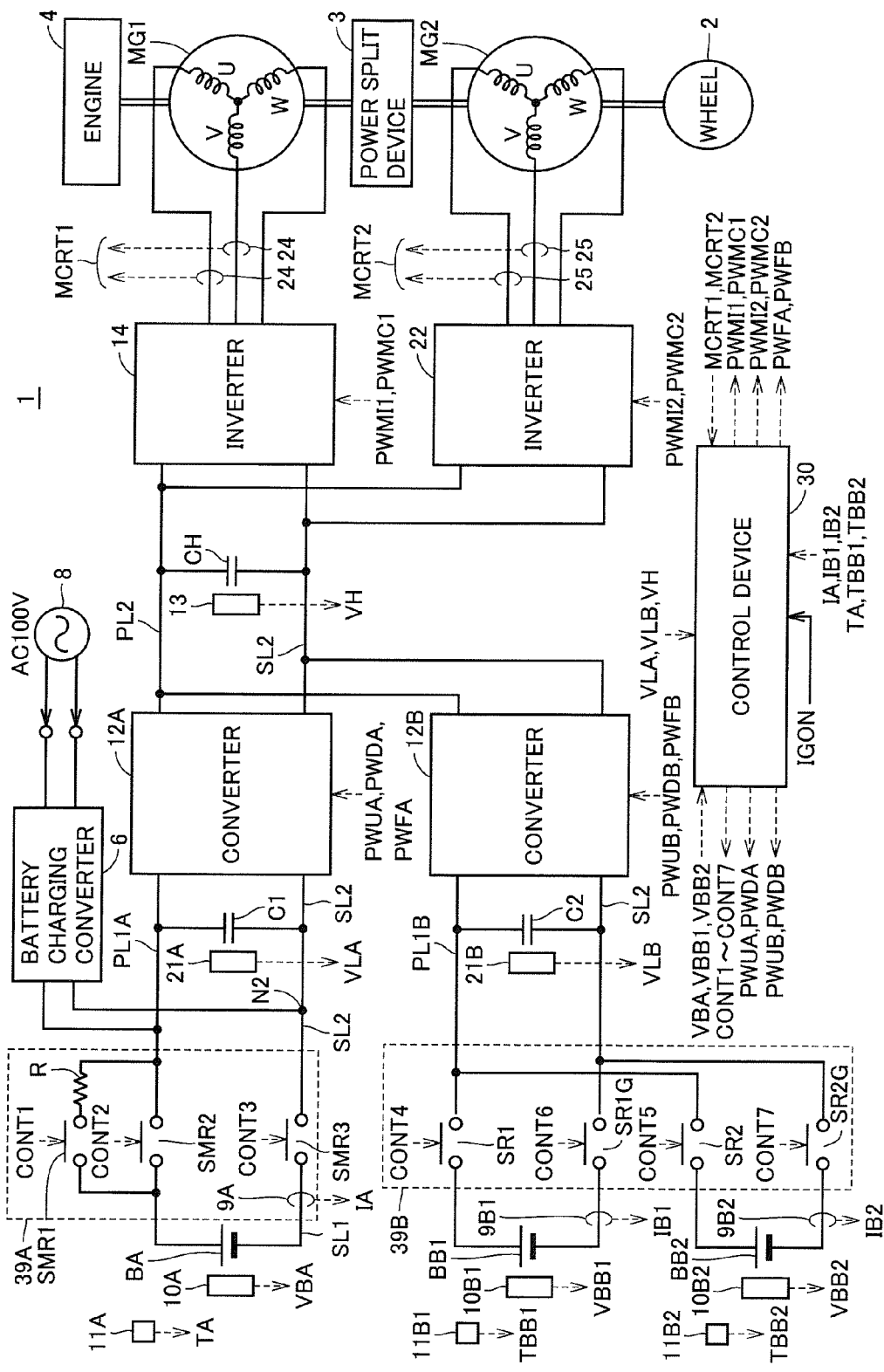
FIG. 1 is a diagram showing a main configuration of an electrically powered vehicle incorporating a power supply system according to an embodiment of the present invention.

Hereinafter reference will be made to the drawings to more specifically describe the present invention in embodiments. In the following description, identical or equivalent components are denoted by identical reference characters and will in principle not be described repeatedly.

FIG. 1 shows a main configuration of an electrically powered vehicle incorporating a power supply system according to an embodiment of the present invention.

With reference to FIG. 1, an electrically powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor-generators MG1, MG2, a wheel 2, a power split device 3, an engine 4, and a control device 30.

The present embodiment provides a power supply system of the electrically powered vehicle including a main power storage device implemented as battery BA, electric power feeding line PL2 supplying electric power to inverter 14 driving motor-generator MG2, converter 12A provided between main power storage device (BA) and electric power feeding line PL2 to serve as a voltage converter converting voltage bidirectionally, batteries BB1, BB2 implementing a plurality of sub power storage devices provided in a manner parallel to each other, and converter 12B provided between the plurality of sub power storage devices (BB1, BB2) and electric power feeding line PL2 to serve as a voltage converter converting voltage bidirectionally. Voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, for example, when they are concurrently used, they can output maximum power tolerated for an electric load (22, MG2) connected to the electric power feeding line. This allows the vehicle without using the engine, i.e., traveling as an EV (Electric Vehicle), to travel with maximum power. If the sub power storage device's state of charge is decreased, the sub power storage device can be exchanged to cause the vehicle to further travel, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared between the plurality of sub power storage devices. This can eliminate the necessity of increasing the number of converters to be equal to that of power storage devices. For further increased EV travelable distance, an additional battery can be introduced in parallel with batteries BB1, BB2.

Preferably, this electrically powered vehicle has mounted thereon a main power storage device and sub power storage devices that are externally chargeable. For this purpose, electrically powered vehicle 1 further includes a battery charging device (a charging converter) 6 for connection to an external power supply 8 which is for example a commercial power supply of AC 100V. Battery charging device (6) converts alternate current to direct current and also adjusts voltage to supply electric power charged to a battery. Note that external charging may be achieved by the above-described configuration and in addition a system connecting a neutral point of a stator coil of motor-generator MG1, MG2 to alternate current power supply or a system causing converters 12A, 12B to together function as an AC/DC conversion device.

Smoothing capacitor C1 is connected between a power supply line PL1A and a ground line SL2. Voltage sensor 21A detects a voltage VLA across ends of smoothing capacitor C1 and outputs it to control device 30. Converter 12A can step up voltage across terminals of smoothing capacitor C1 and supply it to electric power feeding line PL2.

Smoothing capacitor C2 is connected between a power supply line PL1B and ground line SL2. Voltage sensor 21B detects a voltage VLB across ends of smoothing capacitor C2 and outputs it to control device 30. Converter 12B can step up voltage across terminals of smoothing capacitor C2 and supply it to electric power feeding line PL2.

Smoothing capacitor CH smoothes the voltage stepped up by converter 12A, 12B. Voltage sensor 13 senses a voltage VH across terminals of smoothing capacitor CH and outputs it to control device 30.

Alternatively, in an opposite direction, converters 12A, 12B can step down voltage VH across terminals smoothed by smoothing capacitor CH and supply it to power supply lines PL1A, PL1B.

Inverter 14 receives direct current voltage from converter 12B and/or 12A, converts it to 3 phase alternate current voltage, and outputs it to motor-generator MG1. Inverter 22 receives direct current voltage from converter 12B and/or 12A, converts it to 3 phase alternate current voltage, and outputs it to motor-generator MG2.

Power split device 3 is a mechanism coupled to engine 4 and motor-generators MG1, MG2 to distribute power therebetween. The power split device can for example be a planetary gear mechanism having three shafts of rotation of a sun gear, a planetary carrier, and a ring gear. In the planetary gear mechanism, when two of the three shafts of rotation have their rotation determined, that of the other one shaft of rotation is compulsively determined. These three shafts of rotation are connected to engine 4 and motor-generators MG1, MG2 at their respective shafts of rotation, respectively. Motor-generator MG2 has its shaft of rotation coupled to wheel 2 by a reduction gear, a differential gear or the like (not shown). Furthermore, power split device 3 may further have a speed reducer incorporated therein for the shaft of rotation of motor-generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and a node N2.

System main relays SMR1 to SMR3 have their conduction/non-conduction states controlled (or are turned on/off) by relay control signals CONT1 to CONT3, respectively, issued from control device 30.

Voltage sensor 10A measures a voltage VBA across terminals of battery BA. Furthermore, temperature sensor 11A measures a temperature TA of battery BA, and current sensor 9A measures a current IA input/output to/from battery BA. These sensors' measurements are output to control device 30. Based on these measurements, control device 30 monitors a state of battery BA represented by state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (or are turned on/off) by relay control signals CONT4, CONT5, respectively, issued from control device 30. Relays SR1G, SR2G have their conduction/non-conduction states controlled (or are turned on/off) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across terminals of batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by SOC.

Battery BA, BB1, BB2 can for example be a lead-acid battery, a nickel metal hydride battery, a lithium ion battery, or a similar secondary battery, an electric double layer capacitor or a similar capacitor of large capacity, or the like.

In addition, a power storage capacity of each power storage device can be determined, for example, based on such a condition as traveling performance required in electrically powered vehicle 1. Therefore, the main power storage device may be different in power storage capacity from the sub power storage device. Further, a plurality of sub power storage devices may be different from one another in power storage capacity. It is noted in the embodiment of the present invention that batteries BA, BB1 and BB2 are identical in power storage capacity (a maximum value of a storable amount of electric power).

Inverter 14 is connected to electric power feeding line PL2 and ground line SL2. Inverter 14 receives a voltage stepped up from converter 12A and/or converter 12B, and drives motor-generator MG1 for example to start engine 4. Furthermore, inverter 14 returns to converters 12A and 12B the electric power generated by motor-generator MG1 by power transmitted from engine 4. At this time, converters 12A and 12B are controlled by control device 30 to operate as step-down converters.

Current sensor 24 detects a current that flows to motor-generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to 3 phase alternate current voltage, and outputs it to motor-generator MG2 driving wheel 2. Furthermore, inverter 22 returns to converters 12A and 12B the electric power generated by motor-generator MG2 as the vehicle is regeneratively braked. At this time, converters 12A and 12B are controlled by control device 30 to operate as step-down converters.

Current sensor 25 detects a current that flows to motor-generator MG2 as a motor current value MCRT2, and outputs motor current value MCRT2 to control device 30.

Control device 30 is constituted of an electronic control unit (ECU) having a central processing unit (CPU) and a memory (not shown) incorporated therein, and in accordance with a map and a program stored in the memory, uses each sensor's measurement to perform operation processing. Note that control device 30 may have a portion configured to allow an electronic circuit or similar hardware to perform predetermined arithmetic and logical operations.

More specifically, control device 30 receives torque command values for motor-generators MG1, MG2, respectively, the motor-generators' respective speeds, the voltage VBA, VBB1, VBB2, VLA, VLB, VH values, motor current values MCRT1, MCRT2, and a start signal IGON. Then, control device 30 outputs a control signal PWUA instructing converter 12A to step up voltage, a control signal PWDA indicating voltage step-down, a control signal PWFA for fixing an upper arm and a lower arm of converter 12A to the ON state and the OFF state respectively, and a shutdown signal prohibiting an operation.

Similarly, control device 30 outputs a control signal PWUB instructing converter 12B to step up voltage, a control signal PWDB indicating voltage step-down, a control signal PWFB for fixing an upper arm and a lower arm of converter 12B to the ON state and the OFF state respectively, and a shutdown signal prohibiting an operation.

Furthermore, control device 30 outputs a control signal PWMI1 instructing inverter 14 to convert direct current voltage output from converters 12A, 12B to alternate current voltage for driving motor-generator MG1, and a control signal PWMC1 instructing inverter 14 to convert alternate current voltage generated by motor-generator MG1 to direct current voltage and return it toward converters 12A, 12B for regeneration.

Similarly, control device 30 outputs a control signal PWMI2 instructing inverter 22 to convert direct current voltage to alternate current voltage for driving motor-generator MG2, and a control signal PWMC2 instructing inverter 22 to convert alternate current voltage generated by motor-generator MG2 to direct current voltage and return it toward converters 12A, 12B for regeneration.

Figure 2:
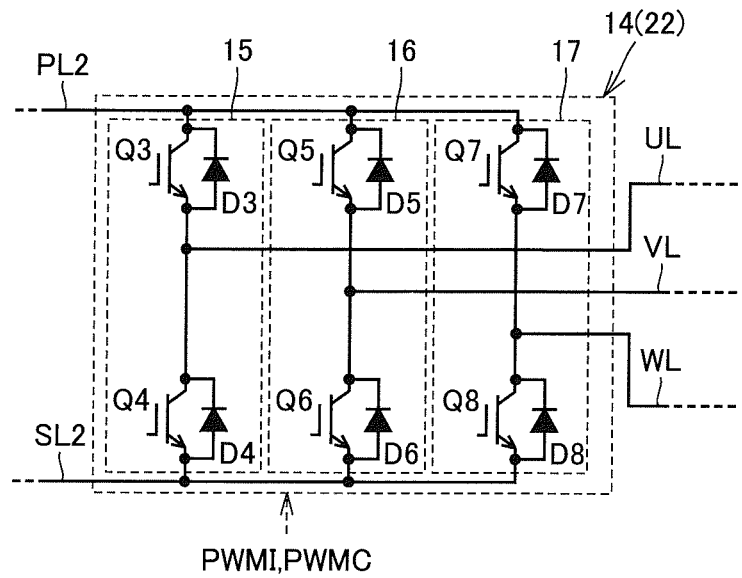
FIG. 2 is a circuit diagram showing in detail a configuration of each inverter shown in FIG. 1.

FIG. 2 is a circuit diagram showing in detail a configuration of each inverter shown in FIG. 1.

With reference to FIG. 2, inverter 14 includes a U-phase arm 15, a V-phase arm 16, and a W-phase arm 17. U-phase arm 15, V-phase arm 16, and W-phase arm 17 are connected between electric power feeding line PL2 and ground line SL2 in parallel.

U-phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4.

Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V-phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as in U-phase arm 15.

W-phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as in U-phase arm 15.

Note that in the present embodiment an IGBT device is indicated as a representative example of a power semiconductor switching element controllable to be turned on/off. In other words, it is also replaceable with a bipolar transistor, a field effect transistor, or a similar power semiconductor switching element.

Each phase arm has an intermediate point connected to motor-generator MG1 at each phase coil at each phase end. In other words, motor-generator MG1 is a 3 phase permanent magnet synchronous motor and the three U-, V-, W-phase coils each have one end connected together to an intermediate point. The U-phase coil has the other end connected to a line UL drawn from a connection node of IGBT devices Q3, Q4. The V-phase coil has the other end connected to a line VL drawn from a connection node of IGBT devices Q5, Q6. The W-phase coil has the other end connected to a line WL drawn from a connection node of IGBT devices Q7, Q8.

Inverter 22 shown in FIG. 1 is also different in that it is connected to motor-generator MG2, however, its internal circuit configuration is similar to inverter 14. Accordingly, it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
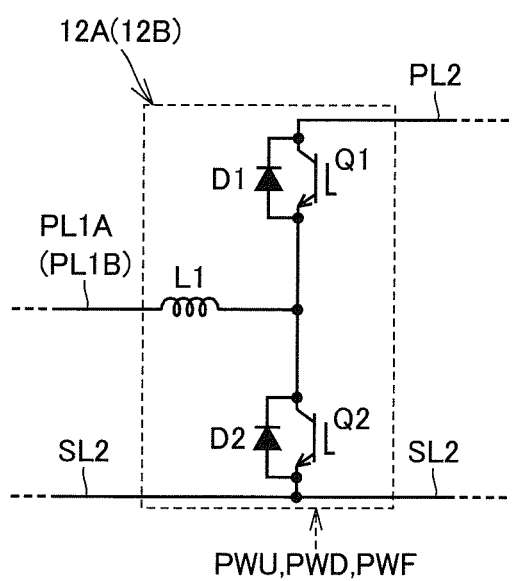
FIG. 3 is a circuit diagram showing in detail a configuration of each converter shown in FIG. 1.

FIG. 3 is a circuit diagram showing in detail a configuration of each converter shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter. IGBT devices Q1, Q2 correspond to the upper arm and the lower arm, respectively.

Converter 12B shown in FIG. 1 is again different from converter 12A in that the former is not connected to power supply line PL1A and instead to power supply line PL1B, however, its internal circuit configuration is similar to converter 12A. Accordingly, it will not be described repeatedly in detail. Furthermore, FIG. 3 shows a converter receiving control signals PWU, PWD, PWF. This is to avoid complexity. Specifically, as shown in FIG. 1, different control signals PWUA, PWDA, PWFA and control signals PWUB, PWDB, PWFB are input to converters 12A and 12B, respectively.

In the power supply system of electrically powered vehicle 1, battery BA (the main power storage device) and a sub power storage device selected from batteries BB1, BB2 (hereinafter also referred to as a "selected sub power storage device BB") and motor-generators MG1, MG2 supply and receive electric power therebetween.

Control device 30 receives values detected by voltage sensor 10A, temperature sensor 11A and current sensor 9A, and in accordance therewith sets an SOC(BA) indicating the main power storage device's residual capacity, an upper limit on electric power input Win(M) indicating an upper limit value of electric power charged thereto, and an upper limit on electric power output Wout(M) indicating an upper limit value of electric power discharged therefrom.

Furthermore, control device 30 receives values detected by voltage sensors 10B1, 10B2, temperature sensors 11B1, 11B2 and current sensors 9B1, 9B2 and in accordance therewith sets an SOC(BB) of selected sub power storage device BB and upper limits on electric power input and output Win(S) and Wout(S) thereto and therefrom, respectively.

Generally, an SOC is indicated by a ratio (%) of each battery's current charged amount to its fully charged state. Furthermore, Win, Wout are indicated as such an upper limit value of electric power that, when that electric power is discharged for a predetermined period of time (e.g., for approximately 10 seconds), the battery of interest (BA, BB1, BB2) is not overcharged/overdischarged.

Figure 4:
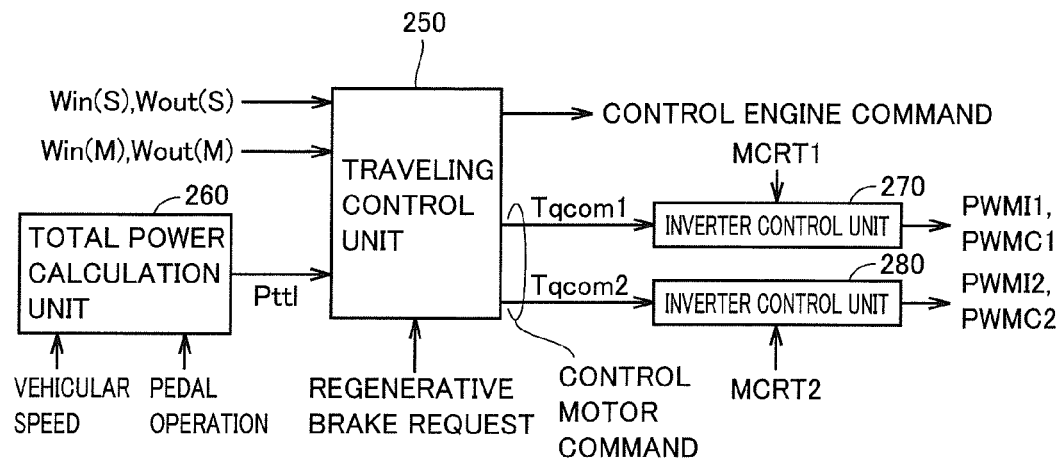
FIG. 4 is a functional block diagram for illustrating how traveling of the electrically powered vehicle is controlled.

FIG. 4 is a functional block diagram for illustrating how control device 30 controls traveling of electrically powered vehicle 1, more specifically, a configuration of power distribution control between engine 4 and motor-generators MG1, MG2. FIG. 4 shows functional blocks, which are implemented by control device 30 executing a previously stored, predetermined program and/or by processing of an operation by electronic circuitry (hardware) in control device 30.

With reference to FIG. 4, a total power calculation unit 260 calculates total power Ptt1 required for the entirety of electrically powered vehicle 1 from a vehicular speed and an operation of a pedal (an accelerator pedal). Note that total required power Ptt1 may also include power required (i.e., the engine's output), depending on a vehicle's condition, for generating electric power by motor-generator MG1 to charge a battery.

A traveling control unit 250 receives upper limits on electric power input/output Win(M), Wout(M) to/from main power storage device BA, upper limits on electric power input/output Win(S), Wout(S) to/from selected sub power storage device BB, total required power Ptt1 from total power calculation unit 260, and a regenerative brake request made when the brake pedal is operated. Traveling control unit 250 generates a control motor command, or torque command values Tqcom1 and Tqcom2, to allow motor-generators MG1, MG2 to in total receive/output electric power within a charging limit (Win(M)+Win(S)) and a discharging limit (Wout(M)+Wout(S)) in total for main power storage device BA and selected sub power storage device BB. Furthermore, to ensure total required power Ptt1, it is assigned between power provided by motor-generator MG2 to drive the vehicle and that provided by engine 4 to do so. In particular, externally charged battery's electric power is maximally utilized to restrict engine 4 from operation or the power provided by engine 4 to drive the vehicle is set to correspond to a range allowing engine 4 to be highly efficiently operable to control the vehicle to travel to achieve high fuel-efficiency.

Figure 5:
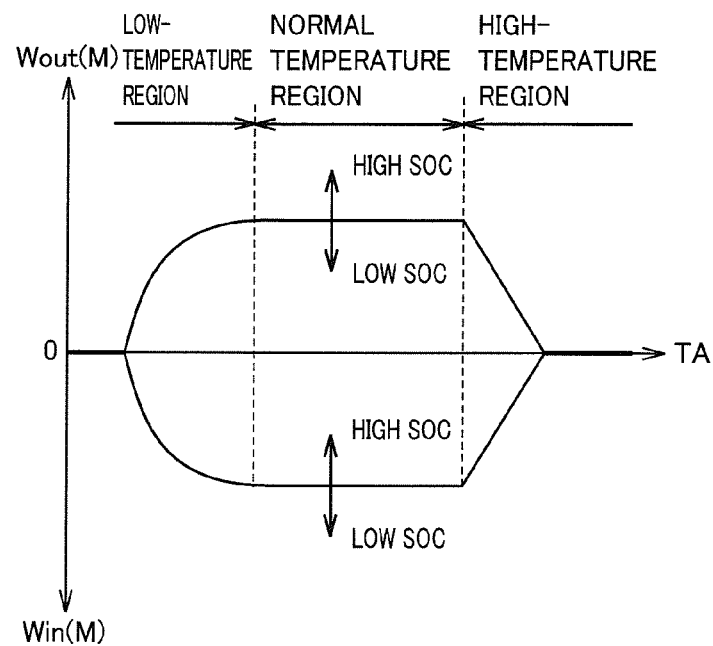
FIG. 5 is a diagram showing an exemplary temperature characteristic of upper limits on electric power input/output to/from a main power storage device.

FIG. 5 is a diagram showing an exemplary temperature characteristic of upper limits on electric power input/output to/from the main power storage device. Referring to FIG. 5, in a high-temperature region or in a low-temperature region, upper limit on electric power input Win(M) and upper limit on electric power output Wout(M) are limited, as compared with those in a normal temperature region. Upper limit on electric power input Win(M) and upper limit on electric power output Wout(M) are variably set in accordance with temperature TA and the SOC(SOC(BA)) of main power storage device BA.

As the temperature characteristics of upper limit on electric power input Win(S) and upper limit on electric power output Wout(S) of the selected sub power storage device are the same as shown in FIG. 5, detailed description will not be repeated hereinafter. Upper limit on electric power input Win(S) and upper limit on electric power output Wout(S) are variably set in accordance with temperature TBB and the SOC(SOC(BB)) of selected power storage device BB. In addition, for example, by having the characteristics shown in FIG. 5 stored in advance as a map, control device 30 can set Win(M), Wout(M), Win(S), and Wout(S).

Referring back to FIG. 4, an inverter control unit 270 receives torque command value Tqcom1 and motor current value MCRT1 of motor-generator MG1 and therefrom generates control signals PWMI1, PWMC1 for inverter 14. Similarly, an inverter control unit 280 receives torque command value Tqcom2 and motor current value MCRT2 of motor-generator MG2 and therefrom generates control signals PWMI2, PWMC2 for inverter 22. Further, traveling control unit 250 generates a control engine command in response to a value requested of power provided by the engine to drive the vehicle, as set. Furthermore, a control device (an engine ECU) (not shown) controls the operation of engine 4 in accordance with the control engine command.

When control device 30 actively uses battery's electric power to travel (i.e., in an EV mode) and total required power Ptt1 is equal to or smaller than the batteries' total upper limit on electric power output Wout(M)+Wout(S), engine 4 is not operated but motor-generator MG2 alone provides power to drive the vehicle to travel. When total required power Ptt1 exceeds Wout(M)+Wout(S), engine 4 is started.

In contrast, when the EV mode is not selected, i.e., in an HV mode, control device 30 controls distribution of driving power between engine 4 and motor-generator MG2 to maintain the batteries' SOC at a predetermined target value. In other words, traveling control under which travel with engine 4 is more actuatable than in the EV mode is carried out.

In the present embodiment, control device 30 determines whether switching of the traveling mode from the EV mode to the HV mode should be made or not, based on an average value of the SOC of main power storage device BA and the SOC of selected sub power storage device BB (hereinafter simply referred to as an "average value of SOCs"). Specifically, when the average value of the SOCs is lower than a predetermined threshold value, control device 30 determines that switching from the EV mode to the HV mode should be made.

In the EV mode, charging and discharging are controlled to preferentially use the electric power of selected sub power storage device BB rather than that of main power storage device BA. As such, when the vehicle is traveling and currently used, selected sub power storage device BB is decreased in SOC, selected sub power storage device BB needs to be switched. For example, if battery BB1 is set as selected sub power storage device BB in starting the vehicle, necessity will arise to subsequently disconnect battery BB1 from converter 12B and connect battery BB2 as new selected sub power storage device BB to converter 12B, i.e., to perform connection switching processing.

Battery BB2 newly set as selected sub power storage device BB is generally higher in output voltage than battery BB1 that has been used so far.

In addition, prior to switching of selected sub power storage device BB as well, main power storage device BA may be different in output voltage from selected sub power storage device BB in use.

In the present embodiment, at least one of converters 12A and 12B performs a voltage step-up operation such that voltage VH is higher than the voltage of the power storage device (VBA, VBB) when both of the main power storage device and the selected sub power storage device are used and when selected sub power storage device BB is switched. Short-circuit between the main power storage device and the selected sub power storage device can thus be prevented.

It is noted that the lower limit value of voltage VH is restricted also from a point of view of control of motor-generator MG1, MG2. Specifically, voltage VH is preferably higher than a voltage induced in motor-generator MG1, MG2. Accordingly, actually, voltage VH is controlled to be higher than any of the lower limit value based on restriction imposed on battery and the lower limit value based on motor control.

Thus, in a mode in which both of the main power storage device and the selected sub power storage device can be used, converter 12A, 12B should perform the voltage step-up operation in order to satisfy the lower limit value based on restriction imposed on battery even in a case where voltage VH can be lowered in terms of motor control, typically in a case where voltage step-up by converter 12A, 12B is not necessary.

Even after electric power in both of batteries BB1 and BB2, that is, all sub power storage devices, is totally consumed, a short-circuit path may be formed between battery BA and batteries BB1 and BB2 through diode D1 of converter 12B and electric power feeding line PL2, provided that connection through a relay is maintained. Therefore, in the power supply system according to the present embodiment, when there is no usable sub power storage device, all sub power storage devices are electrically disconnected from the power supply system.

Necessity of voltage step-up in terms of restriction imposed on battery can thus be eliminated. Therefore, when voltage step-up by converter 12A is not necessary in view of motor control, the upper arm of converter 12A is fixed to the ON state so that electric power loss in converter 12A can be reduced. Therefore, efficiency of the converter, that is, fuel efficiency of electrically powered vehicle 1, is relatively improved.

A process for disconnecting the selected sub power storage device from converter 12B will specifically be described hereinafter.

Figure 6:
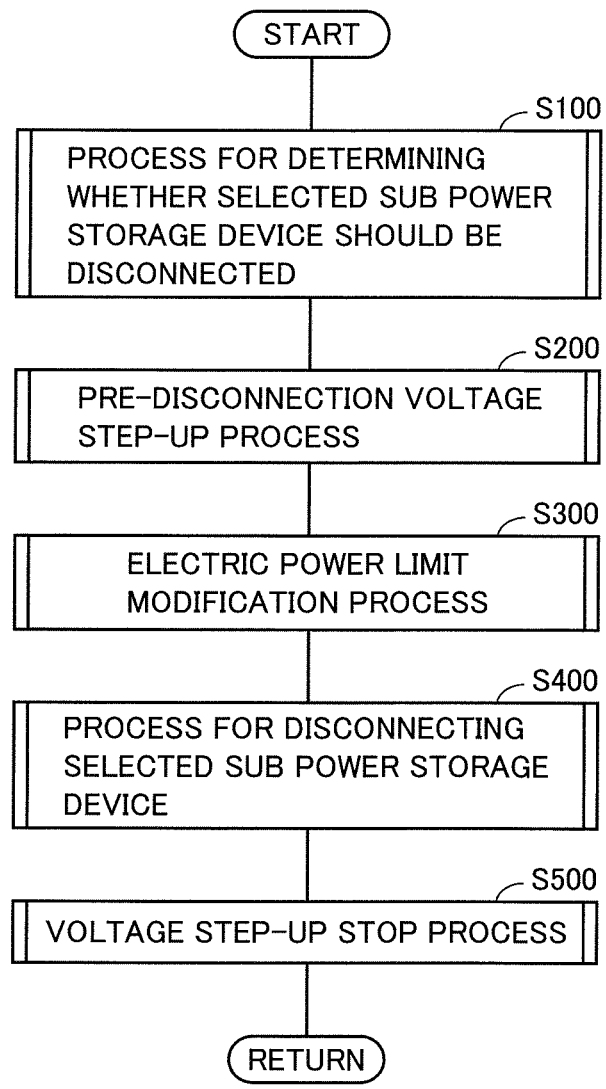
FIG. 6 is a flowchart of a general procedure of a process performed to disconnect a selected sub power storage device in the power supply system of the electrically powered vehicle according to the embodiment of the present invention.

FIG. 6 is a flowchart of a general procedure of a process performed to disconnect a selected sub power storage device in the power supply system of the electrically powered vehicle according to the embodiment of the present invention. Furthermore, FIGS. 7 to 11 are flowcharts for specifically illustrating steps S100, S200, S300, S400, and S500 in FIG. 6.

Control device 30 can execute a previously stored, predetermined program periodically, as predetermined, to repeatedly perform a control processing procedure in accordance with the flowcharts shown in FIGS. 6 to 11, periodically as predetermined. Processing can thus be implemented for disconnecting a sub power storage device in the power supply system of the electrically powered vehicle according to the embodiment of the present invention.

With reference to FIG. 6, in step S100, control device 30 performs a process for determining disconnection of a selected sub power storage device. If control device 30 determines that it is necessary to disconnect the selected sub power storage device, the following steps S200 to S500 are performed. If control device 30 determines in step S100 that it is not necessary to disconnect the selected sub power storage device, steps S200 to S500 are substantially not performed.

In step S200, control device 30 performs a pre-disconnection voltage step-up process, and in step S300, performs an electric power limit modification process so that a request is not generated to the power supply system to excessively charge/discharge while the sub power storage device is being disconnected. In step S400, control device 30 performs a process for actually disconnecting selected sub power storage device BB from converter 12B. In step S500, control device 30 performs a stop-stepping-up-voltage process for stopping voltage step-up processing performed in step S200.

Figure 7:
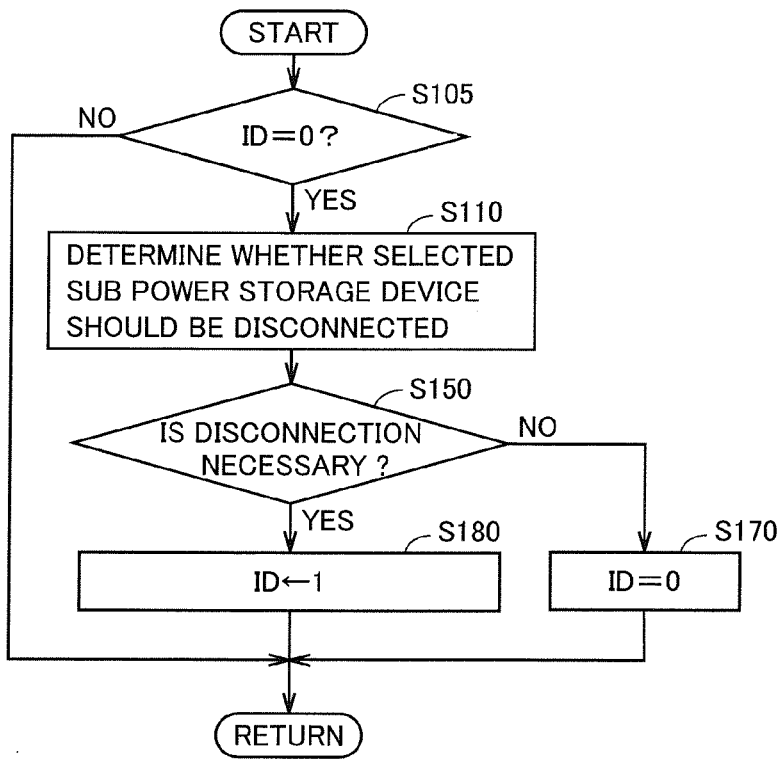
FIG. 7 is a flowchart for illustrating in detail a process performed to determine whether a selected sub power storage device should be disconnected or not, as shown in FIG. 6.

FIG. 7 is a flowchart for illustrating in detail the process performed to determine whether the selected sub power storage device should be disconnected or not (S100), as shown in FIG. 6.

As will be described hereinafter, a variable ID is introduced to indicate the disconnection process's status. Variable ID is set to any of −1 and 0 to 4.

ID=0 indicates a status in which no request for disconnecting a sub power storage device is generated. In other words, when ID=0, currently selected sub power storage device BB supplies electric power, while whether selected sub power storage device BB should be disconnected or not is determined periodically as predetermined. Meanwhile, when the main power storage device alone cannot supply electric power sufficient for motor-generator MG1, MG2 or when disconnection of selected sub power storage device BB is prohibited such as when connection unit 39B failed, it is assumed that ID=−1 is set.

With reference to FIG. 7, in step S105, control device 30 determines whether ID=0 or not. If ID=0 (YES in S105), in step S110, control device 30 makes determination as to whether the selected sub power storage device should be disconnected or not. When the SOC of the sub power storage device in use is lower than a predetermined criterion value (a threshold value) and when there is no new sub power storage device remaining that can replace the selected sub power storage device in use, determination that the selected sub power storage device should be disconnected is made.

In step S150, control device 30 checks a result of determination in step S110 as to whether disconnection is necessary or not. When it is determined that disconnection is necessary (YES in step S150), control device 30 sets ID=1 in order to proceed with the disconnection process in step S180. Namely, ID=1 indicates a status that a request for disconnection of selected sub power storage device BB is generated and the disconnection process is started.

On the other hand, when it is determined in step S150 that disconnection of the selected sub power storage device is not necessary (NO in S150), control device 30 maintains ID=0 in step S170. Meanwhile, when the disconnection process has been started as relation of ID≥1 is once satisfied or when ID=−1 is set because disconnection of the sub power storage device is prohibited (NO in S105), processing in steps S110 to S180 is skipped.

Figure 8:
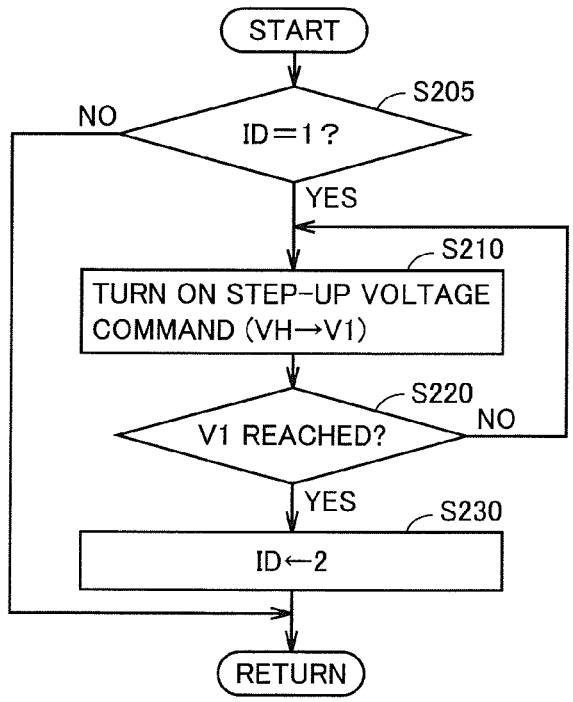
FIG. 8 is a flowchart for illustrating in detail a pre-disconnection voltage step-up process shown in FIG. 6.

FIG. 8 is a flowchart for illustrating in detail the pre-disconnection voltage step-up process (S200) shown in FIG. 6.

With reference to FIG. 8, in the pre-disconnection voltage step-up process, in step S205, control device 30 confirms whether ID=1 or not. If ID=1, a disconnection request to disconnect selected sub power storage device BB is made and the disconnection process is started (YES in S205), control device 30 generates in step S210, a command to converter 12A to step up voltage VH on electric power feeding line PL2 to a predetermined voltage V1. In response to the step-up voltage command, a voltage command value VHref for electric power feeding line PL2 is set to be equal to V1, and in order to implement this voltage command value, control signal PWUA for converter 12A is generated.

Note that predetermined voltage V1 is set to be higher than any higher one of respective output voltages of main power storage device BA and selected sub power storage device BB (for example, BB2). For example, predetermined voltage V1 set at an upper limit control voltage VHmax that can be stepped up by converter 12A can ensure that voltage VH when a step-up voltage command is issued is higher than both of the output voltages of main power storage device BA and selected sub power storage device BB after switching. Alternatively, in view of reducing a loss caused at converter 12A, predetermined voltage V1 may be determined, as occasion demands, to have a margin, depending on voltages output from main power storage device BA and selected sub power storage device BB at that time.

If a step-up voltage command is generated in step S210, in step S220, control device 30 determines based on a value detected by voltage sensor 13 whether voltage VH has reached predetermined voltage V1 or not. Determination as YES is made in step S220, for example, when VH≥V1 continues for a predetermined period of time.

Once voltage VH has reached predetermined voltage V1 (YES in S220), control device 30 furthers the ID from 1 to 2. Until voltage VH reaches V1 (NO in S220), ID=1 is held. In other words, ID=2 indicates a status in which the pre-disconnection voltage step-up process ends and the disconnection process can be furthered. If ID≠1 (NO in S205), processing in subsequent steps S210 to S230 is skipped.

Figure 9:
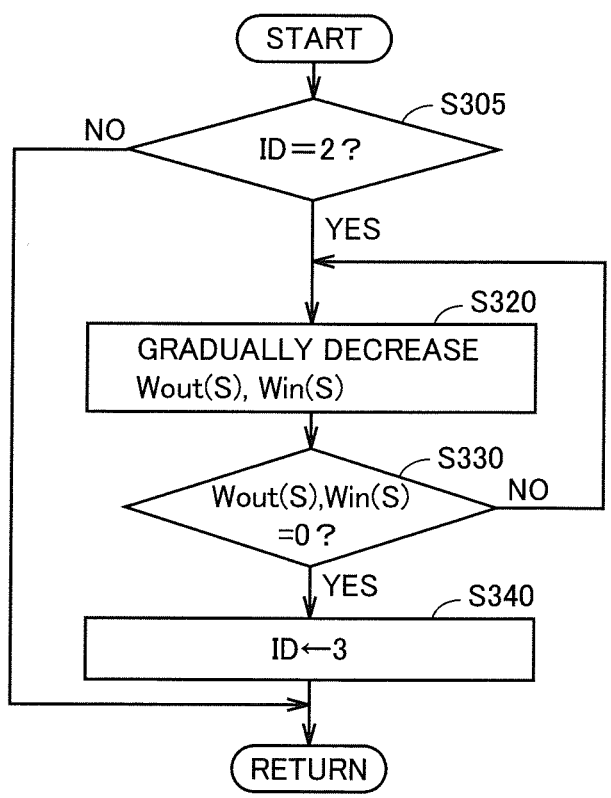
FIG. 9 is a flowchart for illustrating in detail an electric power limit modification process shown in FIG. 6.

Thus, when the pre-disconnection voltage step-up process (step S200) ends, control device 30 performs the electric power limit modification process as shown in FIG. 9.

FIG. 9 is a flowchart for illustrating in detail the electric power limit modification process (S300) shown in FIG. 6.

With reference to FIG. 9, in the electric power limit modification process, initially in step S305, control device 30 determines whether ID=2 or not. If ID=2 is not satisfied (NO in S305), processing in subsequent steps S320 to S340 is skipped.

If ID=2 (YES in S305), in step S320, control device 30 gradually decreases absolute values of upper limits on electric power input/output Win(S), Wout(S) to/from selected sub power storage device BB. For example, Wout(S), Win(S) are decreased gradually toward 0 at a predetermined fixed rate. When Wout(S), Win(S) are decreased in a stepwise fashion, an upper limit value of torque of motor-generator MG2 (power running torque and regenerative torque) discontinuously decreases. Namely, the torque of motor-generator MG2 may suddenly be limited. If such a behavior of motor-generator MG2 is transmitted to a driveshaft, for example, it may affect a behavior of the vehicle such as vibration of the vehicle.

In the present embodiment, by gradually decreasing the absolute values of Wout(S), Win(S) at a predetermined fixed rate, the upper limit value of the torque of motor-generator MG2 can smoothly be lowered. Therefore, as sudden limitation of the torque of motor-generator MG2 can be avoided, influence on the behavior of the vehicle as described above can be avoided.

In step S330, control device 30 determines whether Wout (S), Win(S) have reached 0 or not. Until Wout(S)=Win(S)=0, step S320 is repeated to continuously decrease Wout(S) and Win(S).

Once Wout(S) and Win(S) have reached 0 (YES in S330), control device 30 furthers the ID from 2 to 3 in step S340. In other words, ID=3 indicates a status in which the pre-disconnection voltage step-up process and the electric power limit modification process have ended and selected sub power storage device BB can be disconnected from converter 12B.

When the electric power limit modification process shown in FIG. 9 ends, control device 30 performs the process for disconnecting the sub power storage device in step S400.

Figure 10:
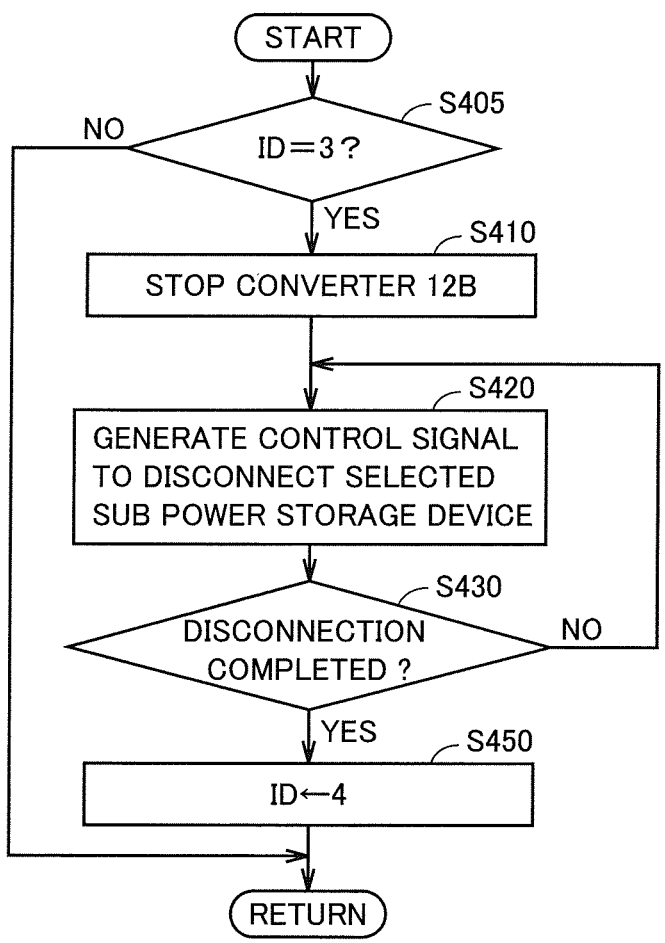
FIG. 10 is a flowchart for illustrating in detail a process for disconnection of a sub power storage device shown in FIG. 6.

FIG. 10 is a flowchart for illustrating in detail the disconnection process to disconnect the sub power storage device (S400), as shown in FIG. 6.

With reference to FIG. 10, in the process for disconnecting the sub power storage device, initially in step S405, control device 30 determines whether ID=3 or not. If ID≠3 (NO in S405), processing in subsequent steps S410 to S450 is skipped.

If ID=3 (YES in S405), in step S410, control device 30 stops converter 12B as preparation for disconnecting the sub power storage device. More specifically, in converter 12B, IGBT devices Q1, Q2 are forced to turn off in response to a shutdown command.

In step S420, control device 30 generates a relay control signal for disconnecting the selected sub power storage device from converter 12B. For example, in an example where sub power storage device BB2 is the selected sub power storage device, control device 30 generates relay control signals CONT5 and CONT7 to turn off relays SR2 and SR2G.

Furthermore, in step S430, control device 30 determines whether disconnection has been completed or not. When disconnection has been completed (YES in S430), control device 30 furthers the ID from 3 to 4 in step S450.

In other words, ID=4 indicates a status in which disconnection between the sub power storage device and converter 12B has been completed.

When the disconnection process in step S400 ends, control device 30 performs the stop-stepping-up-voltage process in step S500.

Figure 11:
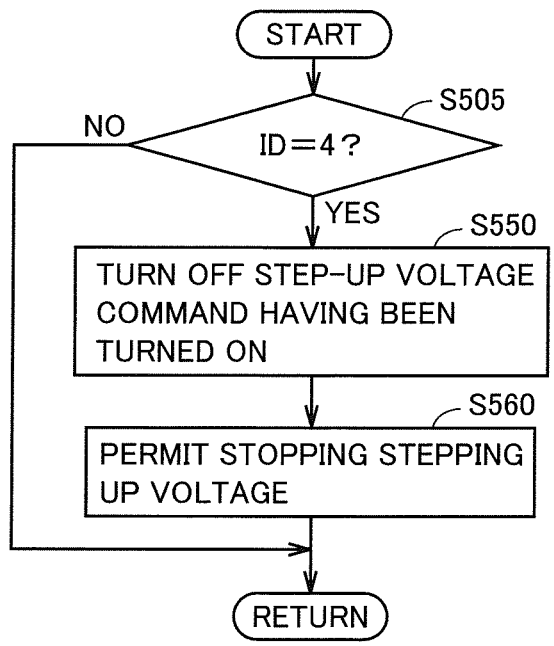
FIG. 11 is a flowchart for illustrating in detail a stop-stepping-up-voltage process shown in FIG. 6.

FIG. 11 is a flowchart for illustrating in detail the stop-stepping-up-voltage process (S500) shown in FIG. 6.

With reference to FIG. 11, in the stop-stepping-up-voltage process, initially in step S505, control device 30 determines whether ID=4 or not. If ID≠4 (NO in S505), processing in step S505 and later is skipped.

If ID=4 (YES in S505), in step S550, control device 30 turns off the step-up voltage command generated in step S210. In addition, in step S560, control device 30 permits stop of voltage step-up by converter 12A. For example, when voltage step-up by converter 12A is not necessary from a point of view of fuel efficiency or the like of the electrically powered vehicle, voltage step-up by converter 12A is stopped. Here, the upper arm of converter 12A is fixed to ON and the lower arm of converter 12A is fixed to OFF.

Figure 12:
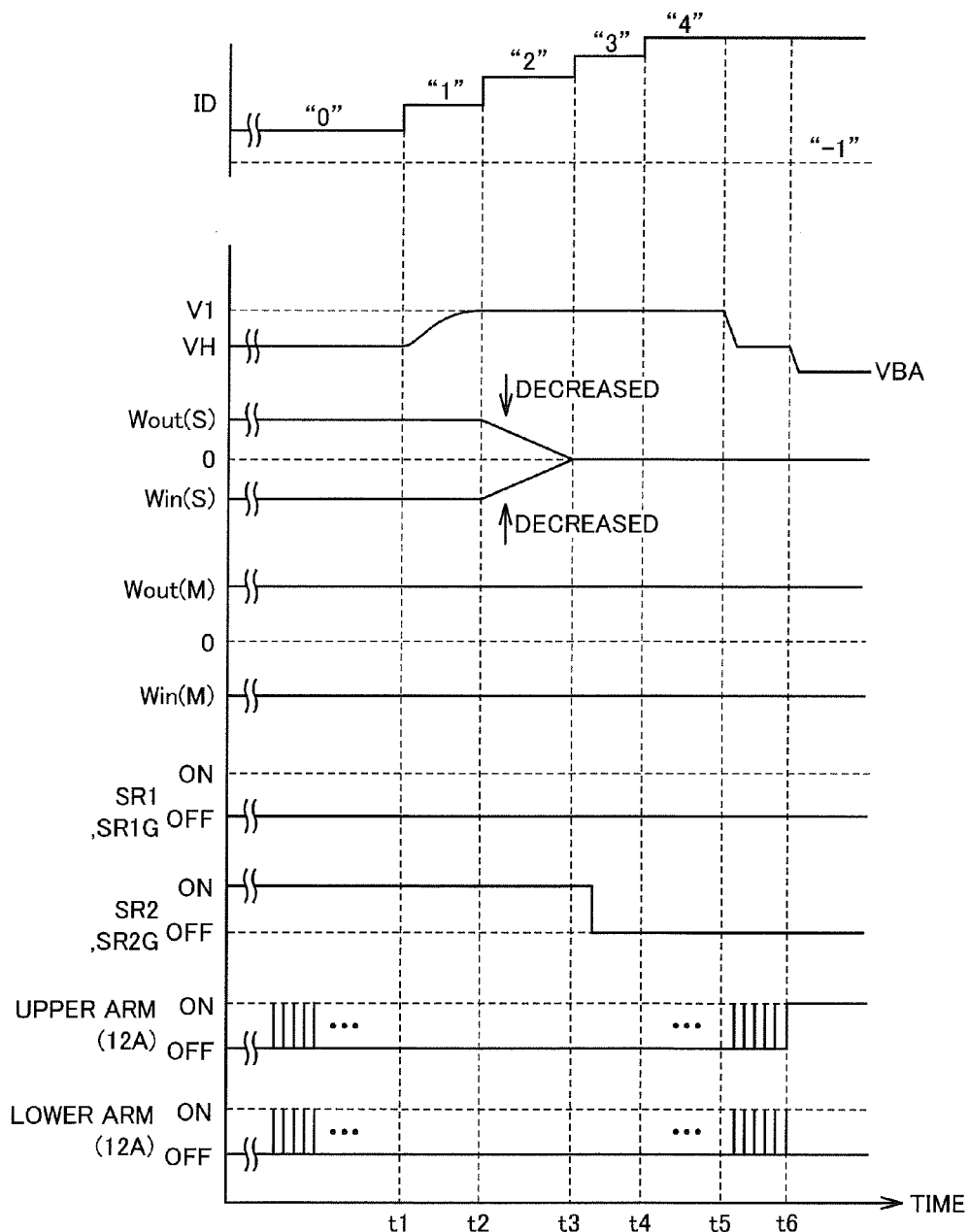
FIG. 12 is a waveform diagram of an operation performed in the process for disconnection of a selected sub power storage device in the power supply system of the electrically powered vehicle according to the embodiment of the present invention.

FIG. 12 shows an operation waveform in the disconnection process to disconnect the selected sub power storage device in the power supply system of the electrically powered vehicle according to the embodiment of the present invention described with reference to FIGS. 6 to 11.

With reference to FIG. 12, during a period until time t1 when ID=0, the disconnection determination process is performed periodically as predetermined, based on the SOC of the currently selected sub power storage device (e.g., battery BB2).

At time t1, in response to lowering in the SOC of selected sub power storage device BB, the disconnection determination process (step S100) is performed to issue a disconnection request to disconnect selected sub power storage device BB and ID=1 is also set to start the disconnection process.

Thus, the pre-disconnection voltage step-up process (step S200) is performed and converter 12A increases voltage VH on electric power feeding line PL2 toward predetermined voltage V1. Processing for stepping up voltage on electric power feeding line PL2 is completed at time t2, and accordingly, the ID is changed from 1 to 2.

When ID=2 is set, the electric power limit modification process (S300) is performed to decrease upper limits on electric power input/output Win(S), Wout(S) to/from selected sub power storage device BB toward 0 gradually at a fixed rate. It is noted that, during this period, converter 12B is controlled to stop charging/discharging of the currently selected sub power storage device (battery BB1). Alternatively, converter 12B may be shut down from time t1.

At time t3, upper limits on electric power input/output Win(S), Wout(S) to/from selected sub power storage device BB are lowered to 0, and in response, the ID is changed from 2 to 3. Once ID=3 is set, the process for disconnecting the sub power storage device starts. More specifically, with converter 12B being shut down, relays SR2, SR2G are turned off. By completing this disconnection process, the ID is changed from 3 to 4 at time t4.

Once ID=4 is set, at time t5, the voltage step-up process for stepping up voltage VH on electric power feeding line PL2 to predetermined voltage V1 is stopped. A series of steps in the process to disconnect the selected sub power storage device thus ends. It is noted that upper limits on electric power input/output Win(M) and Wout(M) to/from main power storage device BA are not changed in the process for disconnecting the selected sub power storage device.

At time t6, stop of voltage step-up by converter 12A is permitted. When voltage step-up by converter 12A is not necessary, as shown in FIG. 12, a switching operation of converter 12A is stopped at time t6 and later. Namely, at time t6 and later, the upper arm of converter 12A is fixed to ON, whereas the lower arm of converter 12A is fixed to OFF. Here, voltage VH is lowered to voltage VBA of main power storage device BA. On the other hand, when voltage step-up by converter 12A is necessary, the switching operation of converter 12A is continued also at time t6 and later.

When the disconnection process above is performed, main power storage device BA alone can be used and hence electric power that can be input and output in the power supply system as a whole decreases. As shown in FIG. 5, the upper limit on electric power input and the upper limit on electric power output to/from main power storage device BA are limited in the high-temperature region or in the low-temperature region. When main power storage device BA alone is used in such a state, deterioration of main power storage device BA is likely.

Therefore, in the present embodiment, at the time of start of the power supply system, that is, at the time of start of a vehicle system in FIG. 1, whether to prohibit disconnection of the selected sub power storage device or not is determined. Specifically, when a temperature condition based on a temperature of at least one of main power storage device BA, sub power storage device BB1 and sub power storage device BB2 is satisfied, disconnection of the selected sub power storage device is prohibited.

Figure 13:
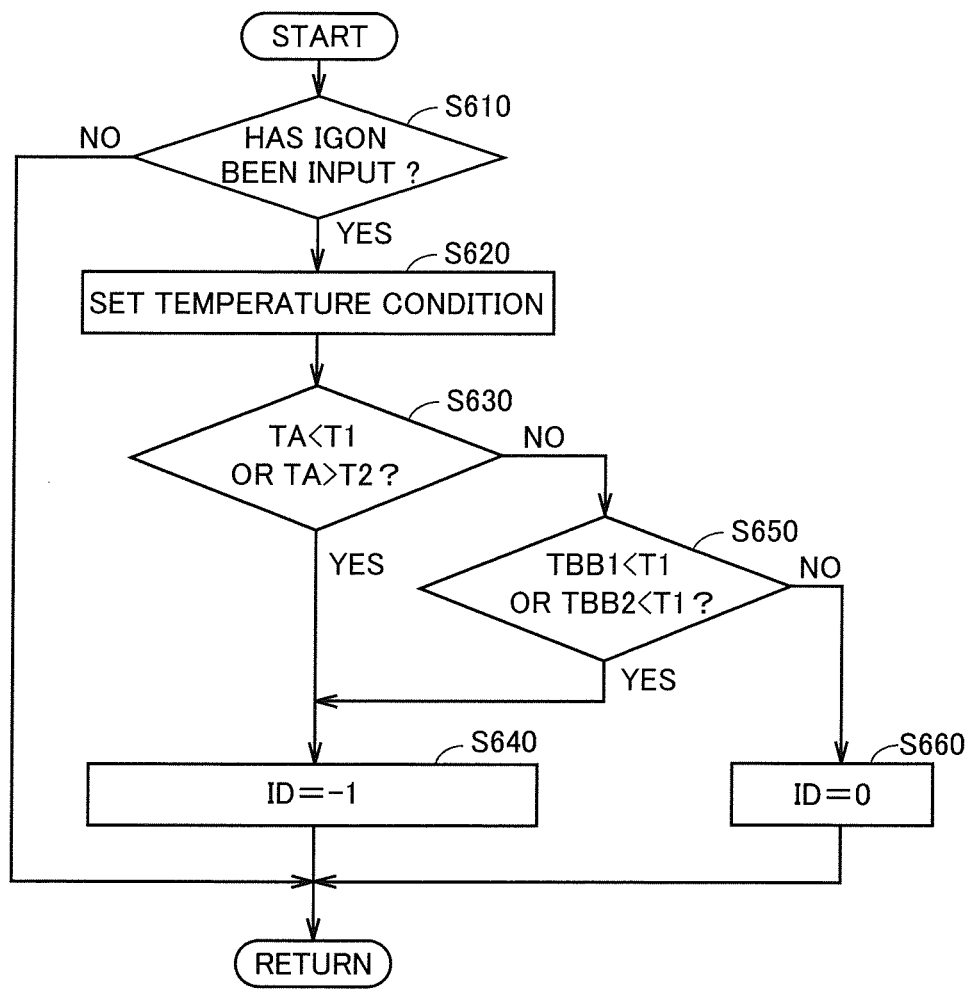
FIG. 13 is a flowchart for illustrating a process for prohibiting disconnection at the time of start of the power supply system.

FIG. 13 is a flowchart for illustrating a process for prohibiting disconnection at the time of start of the power supply system. Referring to FIG. 13, control device 30 determines in step S610 whether start signal IGON has been input to control device 30 or not. Input of start signal IGON means start of the power supply system and the vehicle system (see FIG. 1). When start signal IGON has not been input to control device 30 (NO in S610), processing in steps S620 to S660 is skipped.

On the other hand, when it is determined in step S610 that start signal IGON has been input to control device 30 (YES in S610), control device 30 sets the temperature condition in step S620. The temperature condition here is at least one condition of a condition that temperature TA of main power storage device BA is out of a range from a temperature T1 to a temperature T2 and a condition that a temperature of at least one sub power storage device of sub power storage devices BB1 and BB2 is lower than a lower limit temperature.

In step S630, control device 30 determines whether the condition that temperature TA of main power storage device BA is out of the range from temperature T1 to temperature T2 is satisfied or not. Specifically, control device 30 determines whether any one of the condition that temperature TA of main power storage device BA is lower than lower limit temperature T1 and the condition that temperature TA is higher than upper limit temperature T2 is satisfied or not.

Lower limit temperature T1 corresponds to the lower limit of the normal temperature region shown in FIG. 5. Upper limit temperature T2 corresponds to the upper limit of the normal temperature region. In consideration of a margin, the range from temperature T1 to temperature T2 may be set narrower than the normal temperature region shown in FIG. 5. Namely, temperature T1 may be set higher than the lower limit of the normal temperature region and temperature T2 may be set lower than the upper limit of the normal temperature region.

When any one of the condition that temperature TA is lower than lower limit value T1 and the condition that temperature TA is higher than upper limit value T2 is satisfied (YES in step S630), control device 30 sets ID=−1 in step S640.

On the other hand, when neither of the condition that temperature TA is lower than lower limit value T1 and the condition that temperature TA is higher than upper limit value T2 is satisfied (NO in step S630), control device 30 performs the processing in step S650.

In step S650, control device 30 determines whether a condition that a temperature of a remaining sub power storage device except for the sub power storage device in use (the selected sub power storage device) out of the plurality of sub power storage devices is lower than lower limit temperature T1 is satisfied or not. At the time of start of the power supply system, none of the plurality of sub power storage devices is used. Namely, at the time of start of the power supply system, there is no sub power storage device in use. Therefore, control device 30 determines whether temperature TBB1 of sub power storage device BB1 is lower than lower limit temperature T1 or not and determines whether temperature TBB2 of sub power storage device BB2 is lower than lower limit temperature T1 or not.

It is noted that the "remaining sub power storage device except for the sub power storage device in use out of the plurality of sub power storage devices" is not limited to an unused sub power storage device, but includes also a sub power storage device that has already been disconnected from converter 12B.

When any of the condition that temperature TBB1 is lower than lower limit value T1 and the condition that temperature TBB2 is higher than lower limit value T1 is satisfied (YES in step S650), control device 30 sets ID=−1 in step S640. On the other hand, when neither of the two conditions above is satisfied (NO in step S650), control device 30 sets ID=0 in step S660.

When temperature TA is out of the normal temperature region, upper limit on electric power input Win(M) and upper limit on electric power output Wout(M) are limited. Here, as ID is set to −1, disconnection of selected sub power storage device BB is prohibited. Thus, electric power input and output in the power supply system can be allocated to main power storage device BA and selected sub power storage device BB. Thus, as compared with an example where main power storage device BA alone is used, electric power input/output to/from main power storage device BA can be decreased and hence deterioration of the main power storage device can be suppressed.

Even when the temperature of the sub power storage device not in use is lower than lower limit temperature T1, disconnection of selected sub power storage device BB is prohibited as ID is set to −1. The temperature of the sub power storage device not in use can be estimated to be substantially equal to an atmospheric temperature of the sub power storage device, that is, an outside air temperature. When the temperature of the sub power storage device not in use is lower than lower limit temperature T1, main power storage device BA is cooled by the outside air, which may result in temperature TA of main power storage device BA becoming lower than lower limit temperature T1. In this case as well, upper limit on electric power input Win(M) and upper limit on electric power output Wout(M) are limited. As disconnection of selected sub power storage device BB is prohibited, however, both of main power storage device BA and selected sub power storage device BB can be used. Therefore, deterioration of the main power storage device can be suppressed.

Meanwhile, as the sub power storage device in use generates heat, the temperature thereof is likely to be different from the outside air temperature. Therefore, the temperature of the sub power storage device in use is not adopted in the processing in step S650.

When temperature TA is in the normal temperature region and when the temperature of the sub power storage device not in use is higher than lower limit temperature T1 (NO in step S630), it is less likely that temperature TA of main power storage device BA is lower than lower limit temperature T1. Therefore, in this case, ID=0 is set. Namely, disconnection of the selected sub power storage device from converter 12B is not prohibited.

It is noted that the processing in step S630 and the processing in step S650 may be combined as one process.

Figure 14:
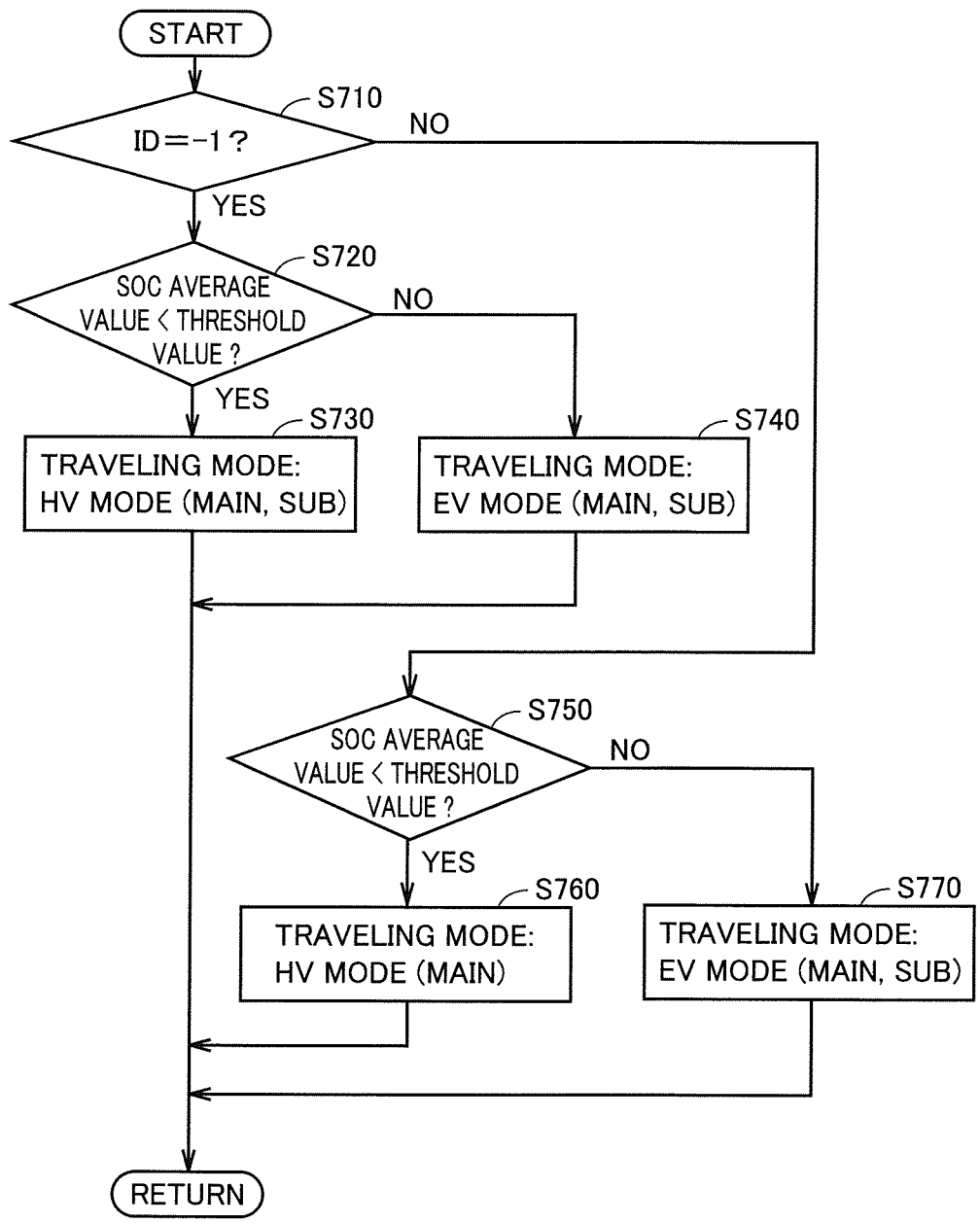
FIG. 14 is a flowchart for illustrating a process for setting a traveling mode performed at the time of start of a vehicle system.

Control device 30 (specifically, traveling control unit 250 shown in FIG. 4) sets the traveling mode at the time of start of the vehicle system, based on the result of the process in the flowchart in FIG. 13. FIG. 14 is a flowchart for illustrating a process for setting the traveling mode performed at the time of start of the vehicle system.

Referring to FIG. 14, in step S710, control device 30 determines whether ID=−1 or not. When ID=−1 (YES in step S710), control device 30 determines in step S720 whether an average value of the SOCs of main power storage device BA and selected sub power storage device BB is lower than a threshold value or not.

When the average value of the SOCs is lower than the threshold value (YES in step S720), control device 30 sets the traveling mode to the HV mode in step S730. When the average value of the SOCs is higher than the threshold value (NO in step S720), control device 30 sets the traveling mode to the EV mode in step S740.

As ID=−1 in any of steps S730 and S740, disconnection of selected sub power storage device BB is prohibited. Namely, the traveling mode in which both of main power storage device BA and selected sub power storage device BB are used is set.

When ID is not set to −1 (NO in step S710), control device 30 determines in step S750 whether the average value of the SOCs of main power storage device BA and selected sub power storage device BB is lower than the threshold value or not.

When the average value of the SOCs is lower than the threshold value (YES in step S750), control device 30 sets the traveling mode to the HV mode in step S760. When the average value of the SOCs is higher than the threshold value (NO in step S750), control device 30 sets the traveling mode to the EV mode in step S760.

In step S760, the traveling mode in which main power storage device BA alone can be used is set. On the other hand, in step S770, the traveling mode in which both of main power storage device BA and selected sub power storage device BB can be used is set. In the traveling mode set in step S770, when the SOC of the selected sub power storage device in use becomes lower, that sub power storage device is switched to a new sub power storage device. In addition, when there is no sub power storage device that can be used, all sub power storage devices are electrically disconnected from the power supply system.

Figure 15:
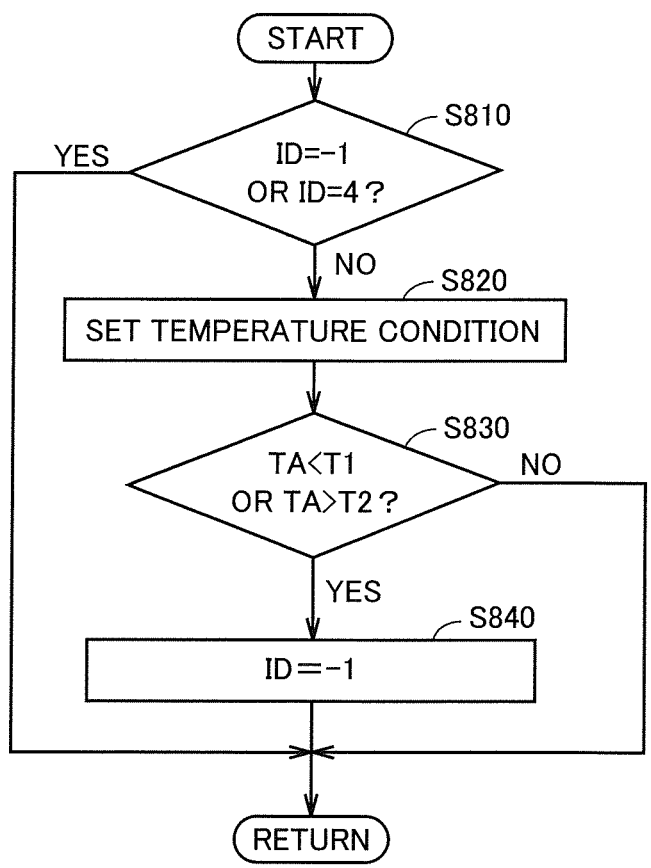
FIG. 15 is a flowchart for illustrating a process for prohibiting disconnection after start of the power supply system is completed.

FIG. 15 is a flowchart for illustrating a process for prohibiting disconnection after start of the power supply system is completed. Here, a state that start of the power supply system has been completed corresponds to a state that the power supply system is being used, that is, the state that the electrically powered vehicle is traveling.

Referring to FIG. 15, control device 30 determines in step S810 whether any of ID=−1 and ID=4 is satisfied or not. When ID=−1 or ID=4 (YES in step S810), processing in steps S820 to S840 is skipped.

When neither of ID=−1 and ID=4 is satisfied (NO in step S810), control device 30 sets a temperature condition in step S820. The temperature condition here is a condition that temperature TA of main power storage device BA is out of the range from temperature T1 to temperature T2.

Control device 30 determines in step S830 whether the condition that temperature TA of main power storage device BA is out of the range from temperature T1 to temperature T2 is satisfied or not. Specifically, control device 30 determines whether any one of the condition that temperature TA of main power storage device BA is lower than lower limit temperature T1 and the condition that temperature TA is higher than upper limit temperature T2 is satisfied or not. When relation of TA<T1 or TA>T2 is satisfied (YES in step S830), control device 30 sets ID=−1 in step S840.

On the other hand, when neither of TA<T1 and TA>T2 is satisfied, that is, when temperature TA is within the range from temperature T1 to temperature T2, the processing in step S830 is skipped. Here, variable ID is not changed.

The temperature of the main power storage device (or each of the plurality of sub power storage devices) is considered as lowest at the time of start of the power supply system, that is, at the time of start of the vehicle system. Therefore, at the time of start of the power supply system, whether to prohibit disconnection of the selected sub power storage device or not is determined based on the temperature of each of the main power storage device and the plurality of sub power storage devices.

At the time of start of the power supply system, initially, it is determined whether or not the temperature of the main power storage device is within a temperature region (the low-temperature region or the high-temperature region)

where electric power input/output to/from the main power storage device is limited. Even though the temperature of the main power storage device is within the normal temperature region, in case that the outside air temperature is low, the main power storage device is cooled and therefore electric power input/output to/from the main power storage device may be limited. Accordingly, at the time of start of the power supply system, the outside air temperature is estimated. As both of sub power storage devices BB1 and BB2 are unused, any lower one of the temperatures of respective sub power storage devices BB1 and BB2 is considered as substantially equal to the outside air temperature. Then, whether the temperature of each of sub power storage devices BB1 and BB2 is lower than lower limit temperature T1 or not is determined.

On the other hand, while the electrically powered vehicle is traveling, whether to prohibit disconnection of the selected sub power storage device or not is determined based only on temperature TA of main power storage device BA. It is less likely that the outside air temperature suddenly lowers during traveling of the vehicle. Namely, unless the outside air temperature of main power storage device BA is lower than lower limit temperature T1 at the time of start of the power supply system, it is also less likely that the outside air temperature of main power storage device BA subsequently becomes lower than lower limit temperature T1. According to the present embodiment, during traveling of the electrically powered vehicle, whether disconnection of the selected sub power storage device should be prohibited or not is determined based only on temperature TA of main power storage device BA. Thus, the processing performed by control device 30 can be simplified.

When temperature TA is included in the normal temperature region, disconnection of the selected sub power storage device is allowed. By disconnecting the selected sub power storage device from converter 12B as described above, the voltage step-up operation by converter 12A can be stopped. Consequently, as reduction in loss in the power supply system and the inverter can be expected, improvement in fuel efficiency of the electrically powered vehicle (the hybrid vehicle) can be expected. On the other hand, when temperature TA is out of the normal temperature region, disconnection of the selected sub power storage device is prohibited and hence the main power storage device can be protected. Therefore, according to the present embodiment, improvement in fuel efficiency during traveling of the electrically powered vehicle and protection of the main power storage device can both be achieved.

Figure 16:
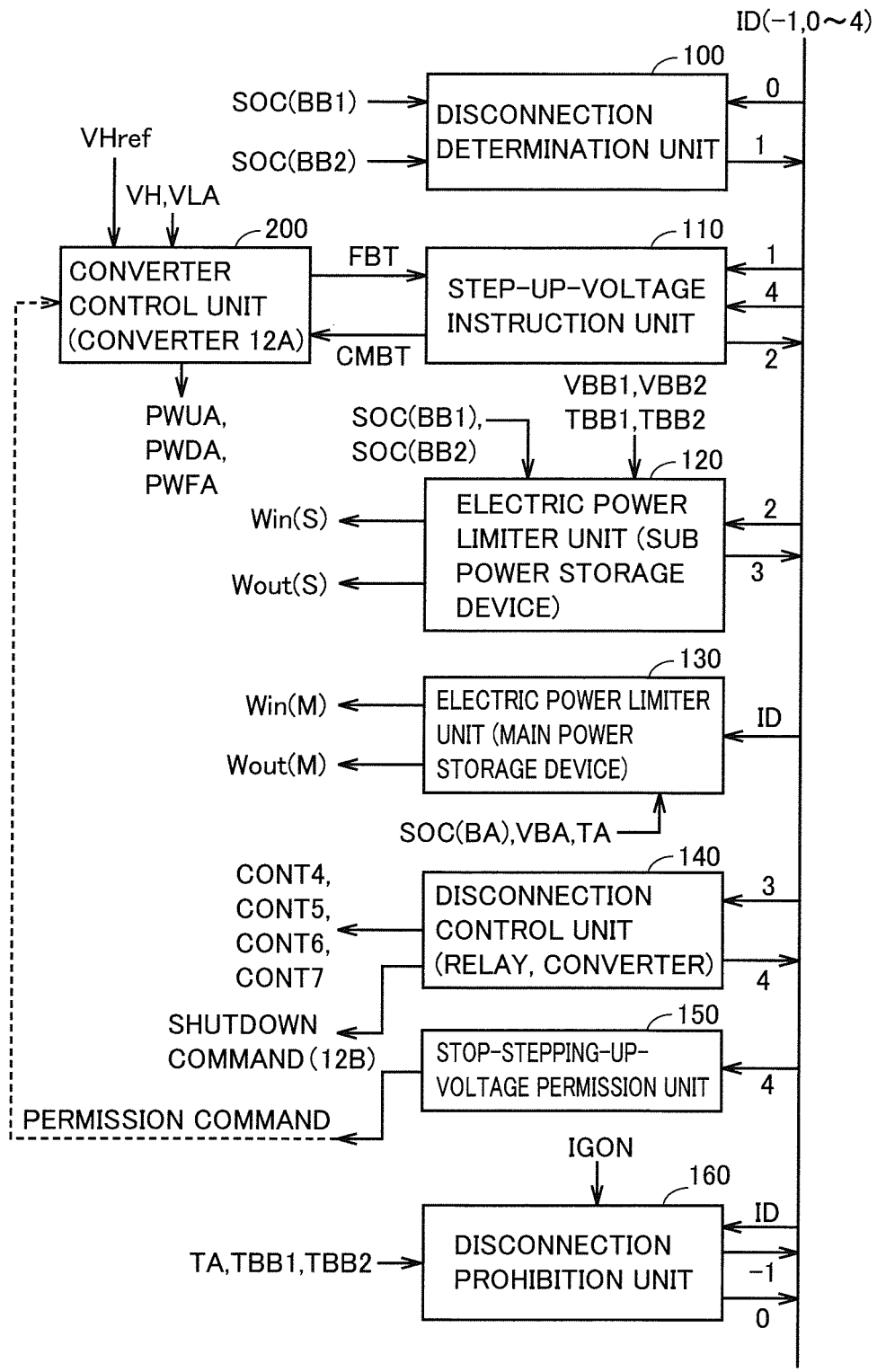
FIG. 16 is a functional block diagram for illustrating a functional portion for the process for disconnection of a selected sub power storage device, in a configuration for controlling the power supply system according to the embodiment of the present invention.

A configuration of a functional portion for the process for disconnecting the selected sub power storage device described in connection with FIGS. 6 to 13 and 15, representing a part of a control configuration of the power supply system according to the embodiment of the present invention will now be described with reference to FIG. 16. FIG. 16 shows functional blocks, which are implemented as control device 30 executing a predetermined program to provide software processing, or by dedicated electronic circuitry (or hardware processing).

With reference to FIG. 16, a disconnection determination unit 100 receives SOC(BB1), SOC(BB2) indicating the states of charge respectively of batteries BB1, BB2. When variable ID shared by the functional blocks is set to 0, disconnection determination unit 100 determines whether selected sub power storage device BB currently used has an SOC decreased to be lower than a predetermined threshold value or not. In addition, disconnection determination unit 100 determines whether there is a new sub power storage device remaining that can replace the currently used selected sub power storage device or not, based on SOC(BB1) and SOC(BB2). The determination processing above is performed in a predetermined cycle.

Namely, when there is no new sub power storage device remaining that can replace the currently used selected sub power storage device, disconnection determination unit 100 determines whether selected sub power storage device BB should be disconnected from converter 12B or not, based on state of charge SOC(BB) of the selected sub power storage device. Then, when it is necessary to disconnect the selected sub power storage device, disconnection determination unit 100 changes the ID from 0 to 1. Thus, a request is generated to disconnect the selected sub power storage device. In other words, disconnection determination unit 100 has a function corresponding to the process in step S100 in FIG. 6.

When a request is generated to disconnect the selected sub power storage device and ID=1 is set, a step-up-voltage instruction unit 110 outputs a step-up voltage command signal CMBT to a converter control unit 200 controlling converter 12A.

Converter control unit 200 generates control signals PWUA, PWDA for converter 12A based on voltages VH, VLA and voltage command value VHref, so that voltage VH on electric power feeding line PL2 reaches voltage command value VHref.

Furthermore, when step-up-voltage instruction unit 110 generates step-up voltage command signal CMBT, converter control unit 200 sets voltage command value VHref=V1 and generates control signal PWUA. If voltage sensor 13 detects voltage VH having reached predetermined voltage V1 continuously for at least a predetermined period of time, converter control unit 200 sets a flag FBT to ON indicating that stepping up voltage is completed.

In response to flag FBT set to ON, step-up-voltage instruction unit 110 sets ID=2 and continues to output step-up voltage command signal CMBT until a disconnection control unit 140, which will be described later, completes the disconnection process and ID=4 is set. In other words, step-up-voltage instruction unit 110 has a function corresponding to step S200 in FIG. 6 and step S550 in FIG. 11.

An electric power limiter unit 120 sets upper limits on electric power input/output Win(S), Wout(S) to/from selected sub power storage device BB. Normally, upper limits on electric power input/output Win(S), Wout(S) are set based on selected sub power storage device BB or battery's SOC(SOC(BB1) or SOC(BB2)), temperature (TBB1 or TBB2) and an output voltage (VB1 or VB2).

In the disconnection process for disconnecting the selected sub power storage device, in contrast, when ID=2 is set, electric power limiter unit 120 decreases upper limits on electric power input/output Win(S), Wout(S) gradually at a fixed rate toward 0, and when Win(S), Wout(S) have reached 0, electric power limiter unit 120 changes the ID from 2 to 3. When the ID reaches 3, electric power limiter unit 120 fixes upper limits on electric power input/output Win(S), Wout(S) to 0. Namely, the function of electric power limiter unit 120 corresponds to the processing in steps S320 to S340 in FIG. 9.

An electric power limiter unit 130 sets upper limits on electric power input/output Win(M) and Wout(M) to/from main power storage device BA. Upper limits on electric power input/output Win(M), Wout(M) are set based on main power storage device BA's SOC(BA), temperature TA, and voltage VBA.

When electric power limiter unit 120 sets ID=3, disconnection control unit 140 in response generates a command to shut down converter 12B. Furthermore, disconnection control unit 140 generates relay control signals CONT4 to CONT7 such that selected sub power storage device BB is disconnected from converter 12B. For example, when battery BB2 is selected as selected sub power storage device BB, relay control signals CONT5 and CONT7 are generated such that relays SR2 and SR2G are turned off. Once this disconnection process has been completed, disconnection control unit 140 ends the shutdown state of converter 12B and changes the ID from 3 to 4. Namely, the function of disconnection control unit 140 corresponds to the process in step S400 in FIG. 6.

When disconnection control unit 140 sets ID=4, a stop-stepping-up-voltage permission unit 150 generates a command permitting stop of a voltage step-up operation by converter 12A and outputs the command. Namely, the function of stop-stepping-up-voltage permission unit 150 corresponds to the processing in step S560 in FIG. 11. Converter control unit 200 generates control signal PWFA for fixing the upper arm of converter 12A to ON, in response to the command from stop-stepping-up-voltage permission unit 150.

A disconnection prohibition unit 160 receives start signal IGON. Here, disconnection prohibition unit 160 sets ID=0 or ID=−1 based on temperature TA of main power storage device BA, temperature TBB1 of sub power storage device BB1 and temperature TBB2 of sub power storage device BB2.

In addition, disconnection prohibition unit 150 receives variable ID during traveling of the electrically powered vehicle. Here, disconnection prohibition unit 160 does not change variable ID when temperature TA of main power storage device BA is within the normal temperature region. On the other hand, disconnection prohibition unit 160 sets ID=−1 when temperature TA of main power storage device BA is out of the normal temperature region.

Namely, the function of disconnection prohibition unit 160 corresponds to the processing in steps S610 to S650 in FIG. 13 and steps S810 to S830 in FIG. 15.

As described above, according to the power supply system of the electrically powered vehicle in the present embodiment, when a predetermined condition regarding a temperature of each of the main power storage device and the plurality of sub power storage devices is satisfied, disconnection between the selected sub power storage device and converter 12B is prohibited. The main power storage device can thus be protected.

In the present embodiment, an electrically powered vehicle incorporating a series/parallel hybrid system in which motive power of an engine can be divided for transmission to driving wheels and a generator by means of a power split device has been shown. The present invention, however, is also applicable, for example, to a series hybrid vehicle in which an engine is used only for driving a generator and driving force for an axle shaft is generated only by a motor using electric power generated by the generator, an electric car, and a fuel cell car. As these vehicles all incorporate a motor generating power to drive the vehicle and a power storage device, the present invention is applicable thereto.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 electrically powered vehicle; 2 wheel; 3 power split device; 4 engine; 6 battery charging converter (external charging); 8 external power supply; 9A, 9B1, 9B2, 24, 25 current sensor; 10A, 10B1, 10B2, 13, 21A, 21B voltage sensor; 11A, 11B1, 11B2 temperature sensor; 12A, 12B converter; 14, 22 inverter; 15 U-phase arm; 16 V-phase arm; 17 W-phase arm; 30 control device; 39A, 39B connection unit; 100 disconnection determination unit; 110 step-up-voltage instruction unit; 120, 130 electric power limiter unit; 140 disconnection control unit; 150 stop-stepping-up-voltage permission unit; 160 disconnection prohibition unit; 200 converter control unit; 250 traveling control unit; 260 total power calculation unit; 270, 280 inverter control unit; BA battery (main power storage device); BB selected sub power storage device; BB1, BB2 battery (sub power storage device); C1, C2, CH smoothing capacitor; CMBT step-up voltage command signal; CONT1 to CONT7 relay control signal; D1 to D8 parallel diode; FBT flag; IA input/output current; IB current; ID variable; IGON start signal; L1 reactor; MCRT1, MCRT2 motor current value; MG1, MG2 motor-generator; N2 node; PL1A, PL1B power supply line; PL2 electric power feeding line; Ptt1 total required power; PWMI1, PWMI2, PWMC, PWMC1, PWMC2 control signal (for inverter); PWU, PWUA, PWDA, PWD, PWDA, PWDB control signal (for converter); Q1 to Q8 IGBT device; R limiting resistor; SL1, SL2 ground line; SMR1 to SMR3 system main relay; SR1, SR1G, SR2, SR2G relay; TA, TBB, TBB1, TBB2 temperature (battery); Tqcom1, Tqcom2 torque command value; UL, VL, WL line (3 phase); VBA, VBB1, VBB2, VLA, VLB, VH voltage; VHref voltage command value; Win, Win(M), Win(S) upper limit on electric power input; and Wout, Wout (M), Wout(S) upper limit on electric power output.

The invention claimed is:

1. A power supply system for an electrically powered vehicle incorporating a motor for generating power to drive the vehicle and an inverter for driving said motor, comprising:
a main power storage device;
an electric power feeding line for feeding electric power to said inverter;
a first voltage converter provided between said electric power feeding line and said main power storage device and configured to convert voltage therebetween bidirectionally;
a plurality of sub power storage devices provided in parallel to each other;
a second voltage converter provided between said plurality of sub power storage devices and said electric power feeding line, and configured to convert voltage between a sub power storage device selected from said plurality of sub power storage devices and said electric power feeding line bidirectionally;
a connection unit provided between said plurality of sub power storage devices and said second voltage converter, and configured to connect and disconnect the selected sub power storage device to and from said second voltage converter; and
a control device configured to control connection and disconnection of said selected sub power storage device to and from said second voltage converter,
said control device including
a disconnection determination unit configured to determine whether a disconnection request for disconnecting said selected sub power storage device from said second voltage converter should be generated based on a state of charge of said selected sub power storage device, when there is no new sub power storage device allowed to replace said selected sub power storage device, and a disconnection prohibition unit configured to instruct said disconnection determination unit not to generate said disconnection request when a temperature condition regarding a temperature of at least one power storage device of said main power storage device and said plurality of sub power storage devices is satisfied.

2. The power supply system for an electrically powered vehicle according to claim 1, wherein
said control device further includes an electric power limiter unit configured to limit input electric power and output electric power to/from said main power storage device when a temperature of said main power storage device is out of a predetermined range,
said at least one power storage device includes said main power storage device, and
said temperature condition includes a first condition that the temperature of said main power storage device is out of said predetermined range.

3. The power supply system for an electrically powered vehicle according to claim 2, wherein
said temperature condition is at least one condition of said first condition and a second condition regarding temperatures of said plurality of sub power storage devices, and
said second condition is a condition that the temperature of at least one sub power storage device of said plurality of sub power storage devices is lower than a predetermined lower limit value.

4. The power supply system for an electrically powered vehicle according to claim 3, wherein
said at least one sub power storage device is a remaining sub power storage device except for said selected sub power storage device out of said plurality of sub power storage devices.

5. The power supply system for an electrically powered vehicle according to claim 4, wherein
said disconnection prohibition unit is configured to set said at least one condition as said temperature condition when said electrically powered vehicle is started, and to set only said first condition as said temperature condition after start of said electrically powered vehicle is completed.

6. An electrically powered vehicle, comprising:
a motor for generating power to drive the vehicle;
an inverter (14) for driving said motor;
a main power storage device;
an electric power feeding line for feeding electric power to said inverter;
a first voltage converter provided between said electric power feeding line and said main power storage device and configured to convert voltage therebetween bidirectionally;
a plurality of sub power storage devices provided in parallel to each other;
a second voltage converter (12B) provided between said plurality of sub power storage devices and said electric power feeding line, and configured to convert voltage between a sub power storage device selected from said plurality of sub power storage devices and said electric power feeding line bidirectionally;
a connection unit provided between said plurality of sub power storage devices and said second voltage converter, and configured to connect and disconnect the selected sub power storage device to and from said second voltage converter; and a control device configured to control connection and disconnection of said selected sub power storage device to and from said second voltage converter,
said control device including
a disconnection determination unit configured to determine whether a disconnection request for disconnecting said selected sub power storage device from said second voltage converter should be generated based on a state of charge of said selected sub power storage device, when there is no new sub power storage device allowed to replace said selected sub power storage device, and
a disconnection prohibition unit configured to instruct said disconnection determination unit not to generate said disconnection request when a temperature condition regarding a temperature of at least one power storage device of said main power storage device and said plurality of sub power storage devices is satisfied.

7. The electrically powered vehicle according to claim 6, wherein
said control device further includes an electric power limiter unit configured to limit input and output electric power to/from said main power storage device when a temperature of said main power storage device is out of a predetermined range,
said at least one power storage device includes said main power storage device, and
said temperature condition includes a first condition that the temperature of said main power storage device is out of said predetermined range.

8. The electrically powered vehicle according to claim 7, wherein
said temperature condition is at least one condition of said first condition and a second condition regarding temperatures of said plurality of sub power storage devices, and
said second condition is a condition that the temperature of at least one sub power storage device of said plurality of sub power storage devices is lower than a predetermined lower limit value.

9. The electrically powered vehicle according to claim 8, wherein
said at least one sub power storage device is a remaining sub power storage device except for said selected sub power storage device out of said plurality of sub power storage devices.

10. The electrically powered vehicle according to claim 9, wherein
said disconnection prohibition unit is configured to set said at least one condition as said temperature condition when said electrically powered vehicle is started, and to set only said first condition as said temperature condition after start of said electrically powered vehicle is completed.

11. A method for controlling a power supply system of an electrically powered vehicle incorporating a motor(MG2) for generating power to drive the vehicle and an inverter (14) for driving said motor,
said power supply system including
a main power storage device,
an electric power feeding line for feeding electric power to said inverter,
a first voltage converter provided between said electric power feeding line and said main power storage device and configured to convert voltage therebetween bidirectionally, a plurality of sub power storage devices provided in parallel to each other, a second voltage converter provided between said plurality of sub power storage devices and said electric power feeding line, and configured to convert voltage between a sub power storage device selected from said plurality of sub power storage devices and said electric power feeding line bidirectionally, a connection unit provided between said plurality of sub power storage devices and said second voltage converter, and configured to connect and disconnect the selected sub power storage device to and from said second voltage converter, and a control device configured to control connection and disconnection of said selected sub power storage device to and from said second voltage converter, said method comprising the steps of:

determining whether a request for disconnecting said selected sub power storage device from said second voltage converter should be generated based on a state of charge of said selected sub power storage device, when there is no new sub power storage device allowed to replace said selected sub power storage device; and prohibiting generation of said request when a temperature condition based on a temperature of at least one power storage device of said main power storage device and said plurality of sub power storage devices is satisfied.

12. The method for controlling a power supply system of an electrically powered vehicle according to claim 11, wherein said control device is configured to limit input electric power and output electric power to/from said main power storage device when a temperature of said main power storage device is out of a predetermined range, said at least one power storage device includes said main power storage device, and said temperature condition includes a first condition that the temperature of said main power storage device is out of said predetermined range.

13. The method for controlling a power supply system of an electrically powered vehicle according to claim 12, wherein said temperature condition is at least one condition of said first condition and a second condition regarding temperatures of said plurality of sub power storage devices, and said second condition is a condition that the temperature of at least one sub power storage device of said plurality of sub power storage devices is lower than a predetermined lower limit value.

14. The method for controlling a power supply system of an electrically powered vehicle according to claim 13, wherein said at least one sub power storage device is a remaining sub power storage device except for said selected sub power storage device out of said plurality of sub power storage devices.

15. The method for controlling a power supply system of an electrically powered vehicle according to claim 14, wherein said prohibiting step includes the step of setting said temperature condition, and said at least one condition is set as said temperature condition when said electrically powered vehicle is started, and only said first condition is set as said temperature condition after start of said electrically powered vehicle is completed.

* * * * *